(12) United States Patent
Xu et al.

(10) Patent No.: US 9,967,781 B2
(45) Date of Patent: May 8, 2018

(54) APPARATUS AND METHOD FOR SUPPORTING HANDOVER

(75) Inventors: Lixiang Xu, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

(21) Appl. No.: 14/236,053

(22) PCT Filed: Jul. 27, 2012

(86) PCT No.: PCT/KR2012/006022
§ 371 (c)(1),
(2), (4) Date: Jan. 29, 2014

(87) PCT Pub. No.: WO2013/019035
PCT Pub. Date: Feb. 7, 2013

(65) Prior Publication Data
US 2014/0187245 A1 Jul. 3, 2014

(30) Foreign Application Priority Data

Jul. 29, 2011 (CN) .......................... 2011 1 0225655

(51) Int. Cl.
*H04W 36/00* (2009.01)
*H04W 4/00* (2009.01)

(52) U.S. Cl.
CPC ............... *H04W 36/0016* (2013.01)

(58) Field of Classification Search
CPC .................. G01S 11/10; H04B 7/2606; H04L 45/00–45/748; H04M 11/04;
(Continued)

(56) References Cited

U.S. PATENT DOCUMENTS

| 6,490,452 B1 | 12/2002 | Boscovic et al. |
| 2006/0172738 A1* | 8/2006 | Kwon ................... H04W 36/12 455/439 |

(Continued)

FOREIGN PATENT DOCUMENTS

| WO | WO 2012135793 A2 | 10/2012 |
| WO | WO 2013006384 A1 | 1/2013 |

OTHER PUBLICATIONS

International Search Report dated Jan. 30, 2013 in connection with International Patent Application No. PCT/KR2012/006022, 3 pages.

(Continued)

*Primary Examiner* — German J Viana Di Prisco
*Assistant Examiner* — Mark G. Pannell

(57) ABSTRACT

An embodiment of the invention provides a method for supporting handover. That is, inform a target base station which bear in bearers to be handed over is a Local Internet Protocol (IP) Access (LIPA) bearer, by a source base station. Regarding the LIPA bearer, the target base station sends a message to a corresponding Local Gateway (L-GW), to request the L-GW to update downlink user plane transmission. By adopting the method for supporting handover, provided by an embodiment of the invention, a correct user plane transmission may be established for a User Equipment (UE), to enable a user plane to be correctly established during handover process. Thus, continuity of LIPA service may be guaranteed, and successful handover may be achieved.

8 Claims, 16 Drawing Sheets

(58) Field of Classification Search
CPC ............... H04W 16/06; H04W 16/32; H04W 36/00–36/385; H04W 36/0083; H04W 36/0055; H04W 36/04; H04W 36/08; H04W 36/12; H04W 36/14; H04W 36/18; H04W 36/30; H04W 36/32; H04W 48/17–48/20; H04W 52/40; H04W 64/00; H04W 64/006; H04W 84/045; H04W 88/06; H04W 92/02
USPC .......... 370/331–334, 400–405; 455/400–405
See application file for complete search history.

(56) References Cited

U.S. PATENT DOCUMENTS

| | | | |
|---|---|---|---|
| 2009/0296655 A1* | 12/2009 | Tamura | 370/331 |
| 2010/0329208 A1* | 12/2010 | Hayashi et al. | 370/331 |
| 2011/0070889 A1* | 3/2011 | Li | 455/436 |
| 2011/0171953 A1* | 7/2011 | Faccin | H04W 48/08 455/426.1 |
| 2011/0228750 A1* | 9/2011 | Tomici et al. | 370/338 |
| 2012/0039213 A1* | 2/2012 | Cheng et al. | 370/254 |
| 2012/0182972 A1* | 7/2012 | Guan et al. | 370/331 |
| 2012/0207129 A1* | 8/2012 | Sun | 370/331 |
| 2012/0246325 A1* | 9/2012 | Pancorbo Marcos et al. | 709/227 |
| 2013/0003697 A1* | 1/2013 | Adjakple et al. | 370/331 |
| 2013/0003698 A1* | 1/2013 | Olvera-Hernandez et al. | 370/331 |
| 2013/0089076 A1 | 4/2013 | Olvera-Hernandez et al. | |
| 2013/0301610 A1* | 11/2013 | Ali et al. | 370/331 |

OTHER PUBLICATIONS

Written Opinion of International Searching Authority dated Jan. 30, 2013 in connection with International Patent Application No. PCT/KR2012/006022, 5 pages.
Antoine Stephane et al., "Mechanisms and Hierarchical Topology for Fast Handover in Wireless IP Networks", IEEE Communication Magazine, Nov. 2000, 4 pages.
Communication Pursuant to Rule 164(1) EPC dated May 18, 2015 in connection with European Patent Application No. 12820081.3; 6 pages.
"LIPA Solution-1, Stand-Alone L-GW with Sxx Being Both User-Plane and Control-Plane"; 3GPP TSG SA WG2 Mtg. #79; TD S2-102433; May 10-14, 2010; Kyoto, Japan; 9 pages.
"Call Flows for Stand-Alone Logical L-GW Solution"; 3GPP TSG SA WG2 Mtg. #86; TD S2113295; Jul. 11-15, 2011; Naantali, Finland; 9 pages.
Extended European Search Report dated Sep. 17, 2015 in connection with European Patent Application 12820081.3; 21 pages.
3GPP TR 23.859 V0.4.0; "LIPA Mobility and SIPTO at the Local Network"; Release 11; Jul. 2011; 55 pages.
3GPP TSG-RAN WG2 Meeting #72; "Introduction of LIPA Function"; R2-106961; Jacksonville, USA; Nov. 15-19, 2010; 16 pages.
3GPP TSG SA WG2 Meeting #84; "LIMONET—Standalone Local GW selection and addressing"; TD S2-112221; Bratislava, Slovakia; Apr. 11-15, 2011; 5 pages.
SA WG2 Meeting #86; "Control and user plane Sxx based architecture"; S2-113756; Naantali, Finland; Jul. 11-15, 2011; 6 pages.
Magnus Olsson, et al.; "EPC and 4G Packet Networks"; XP055211328; Chapters 6.1, 6.2, 14.4, 16.2, 17.4; Jan. 1, 2013; 38 pages.

* cited by examiner

[Fig. 1]
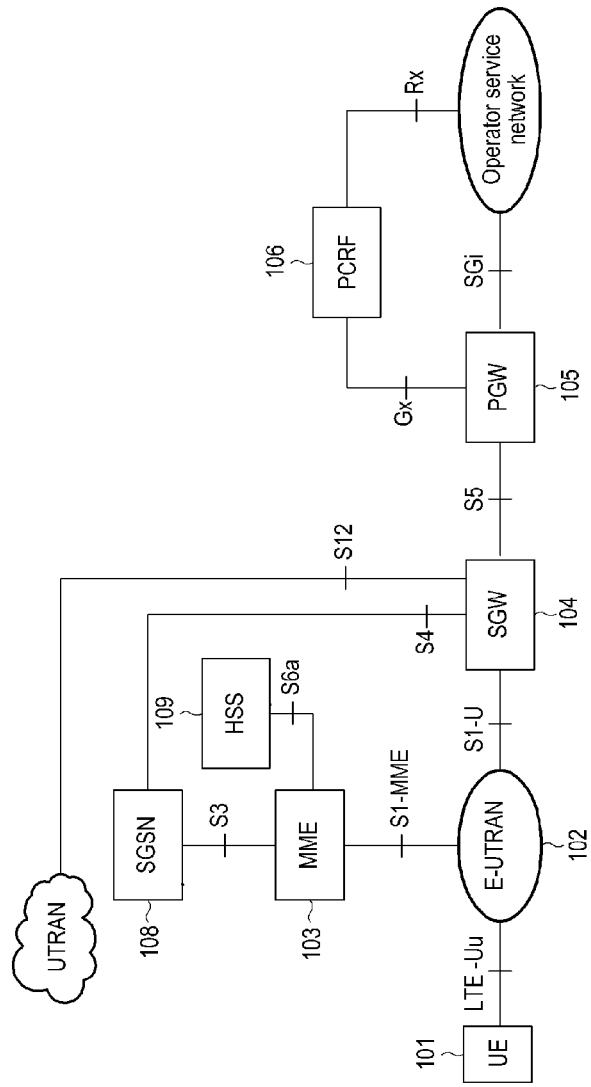
[Fig. 2a]
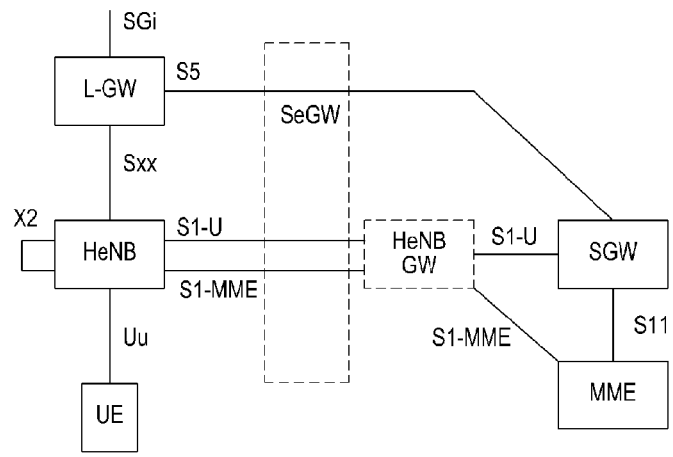

[Fig. 2b]
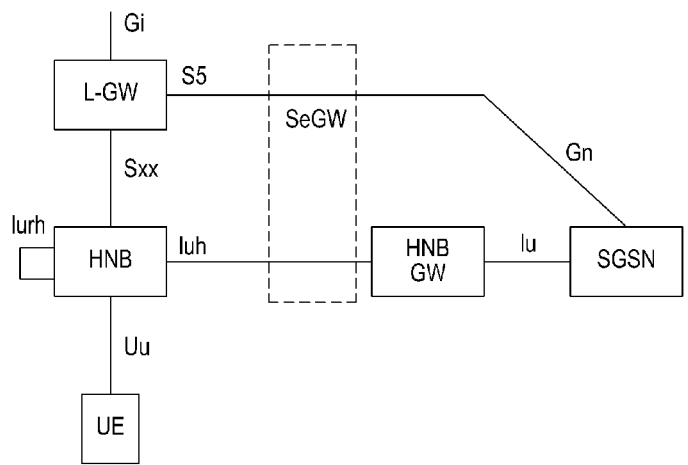
[Fig. 2c]
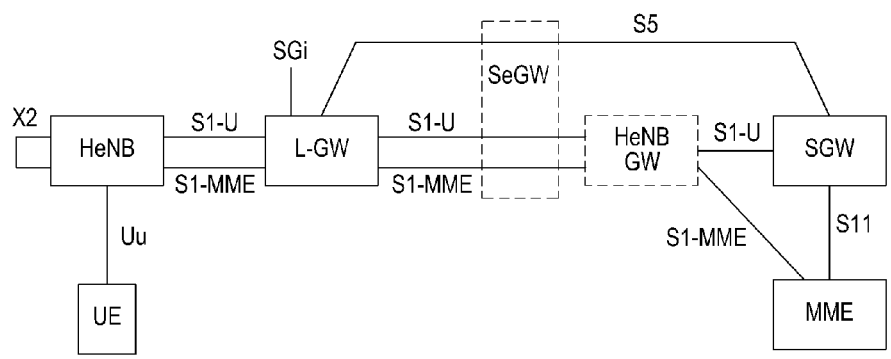

[Fig. 3]
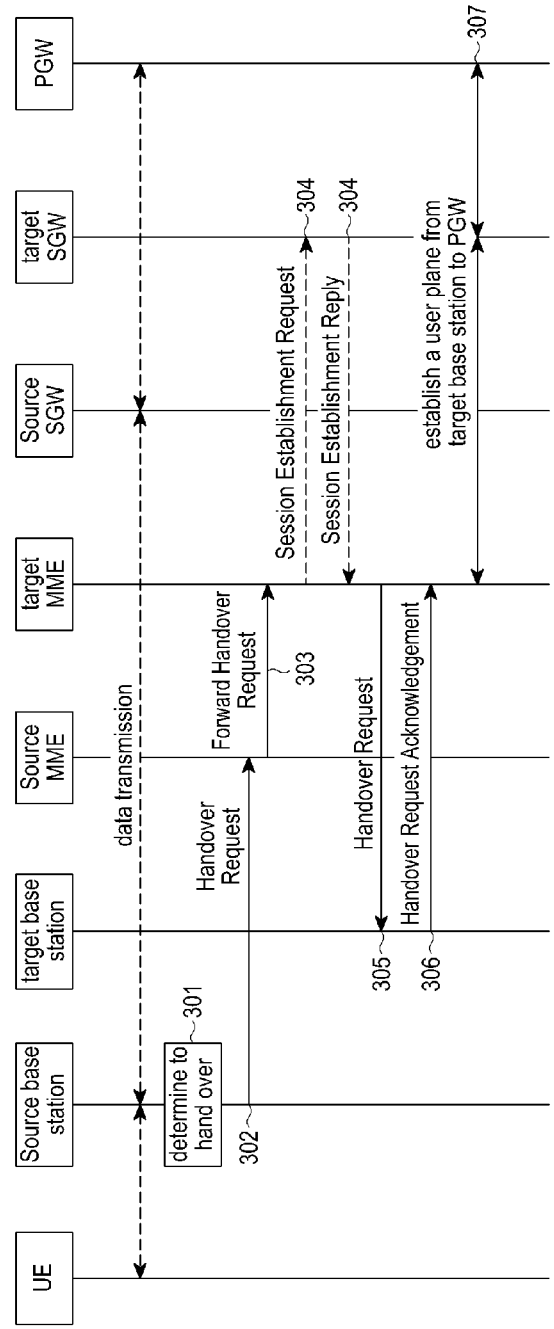

[Fig. 4]
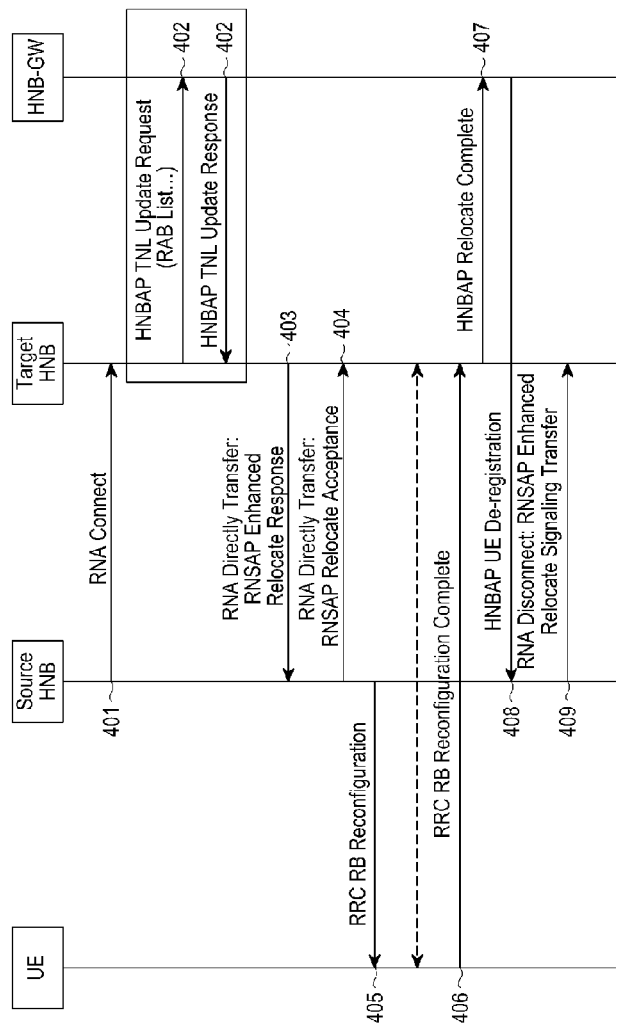
[Fig. 5]
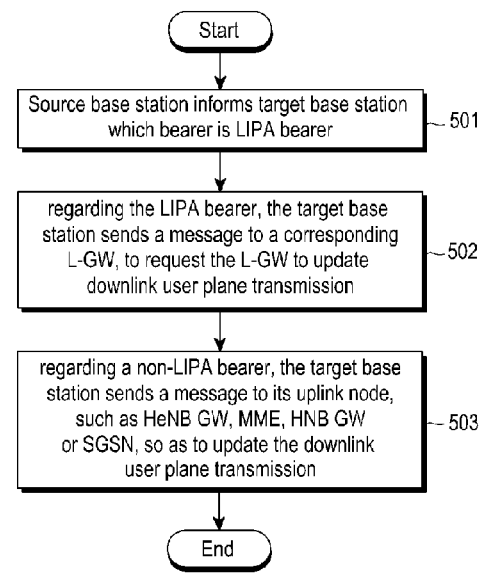

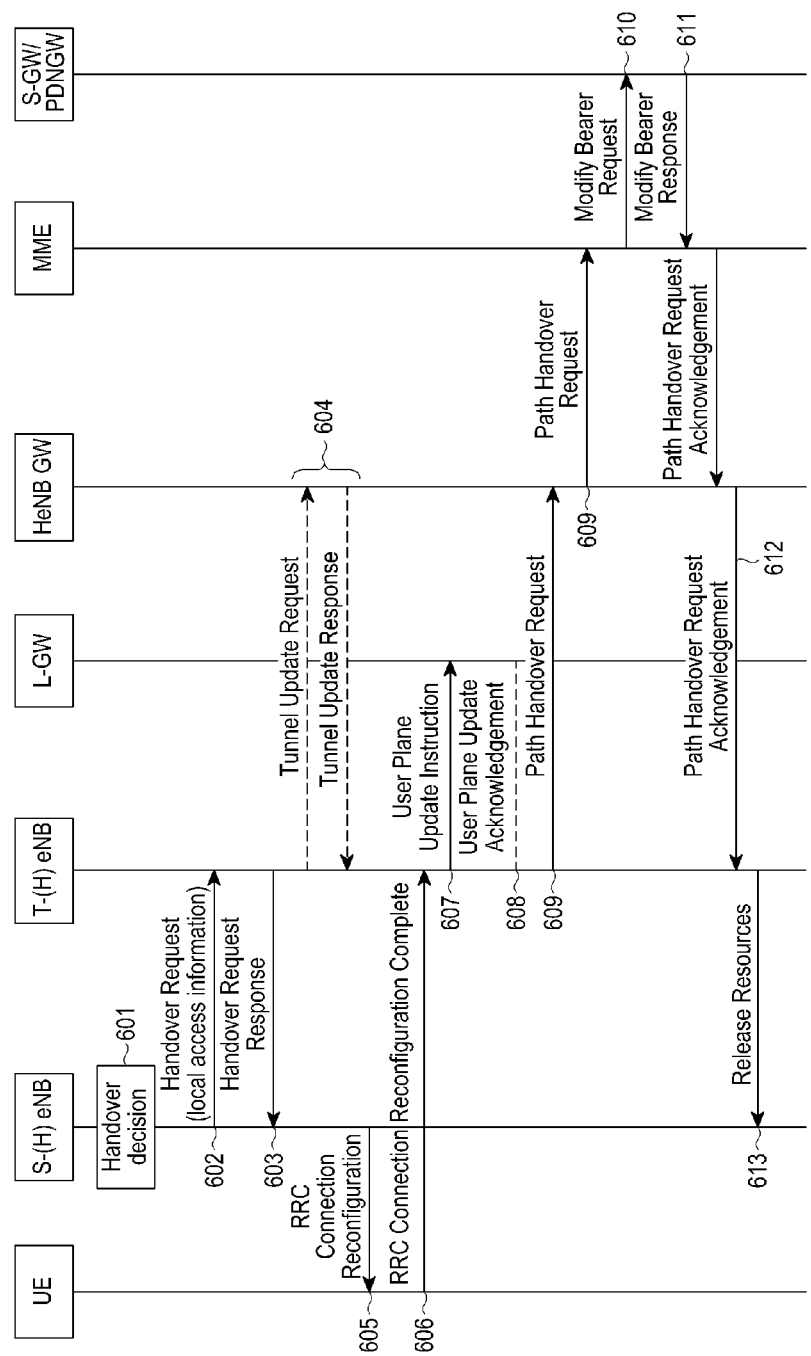
[Fig. 6]

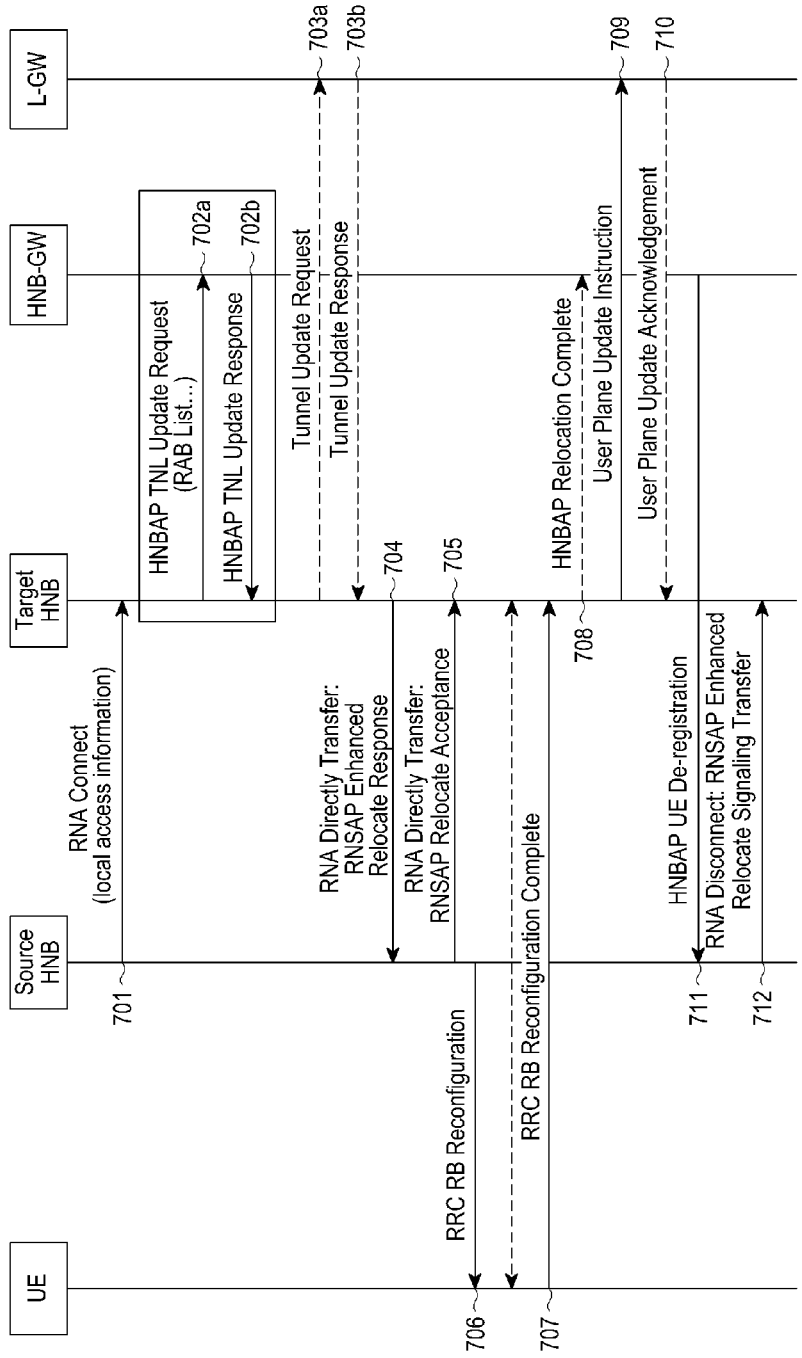
[Fig. 7]

[Fig. 8]
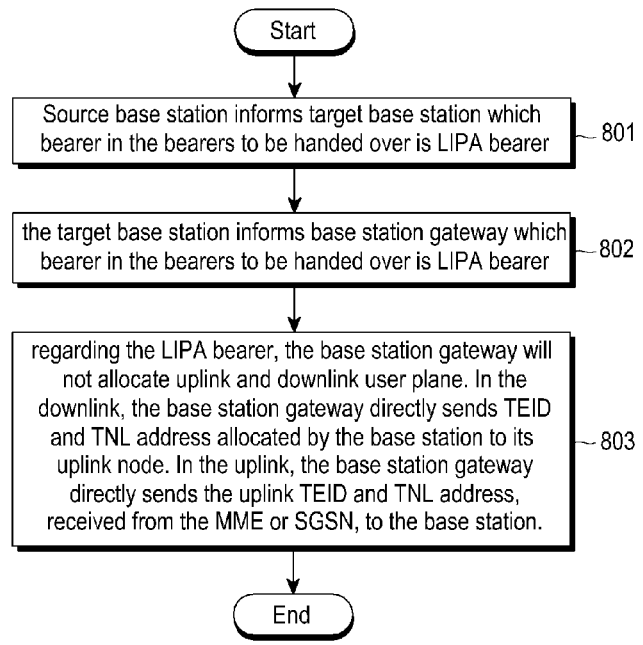

[Fig. 9]
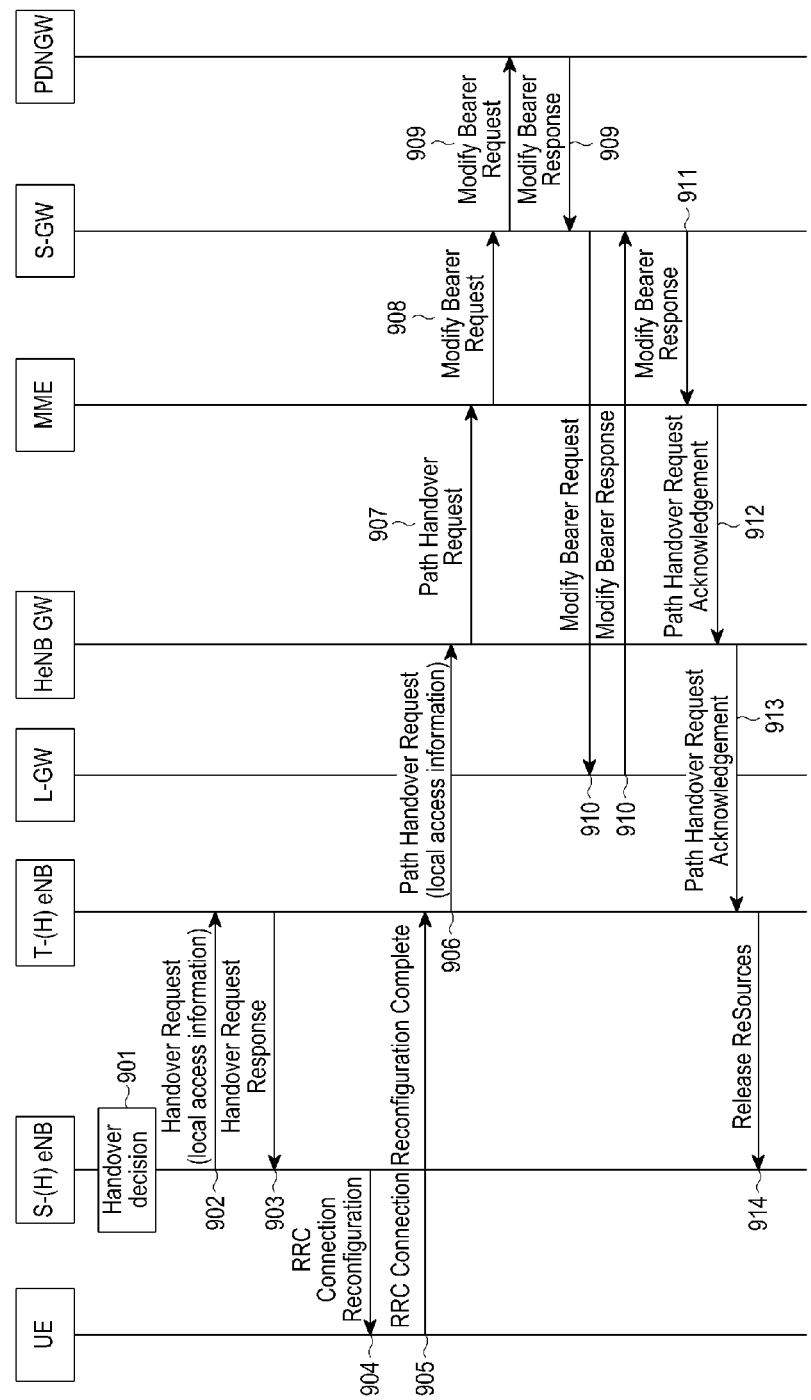

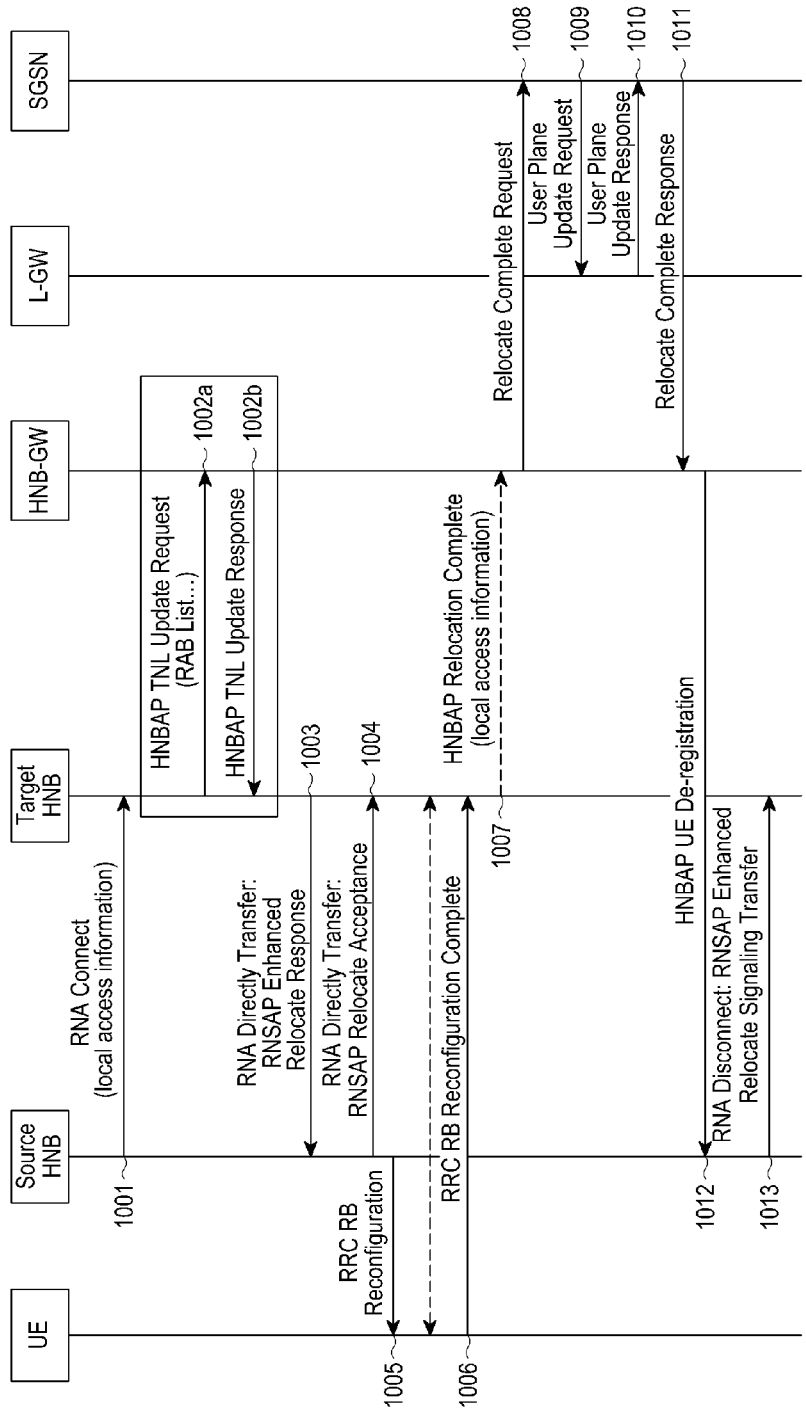
[Fig. 10]

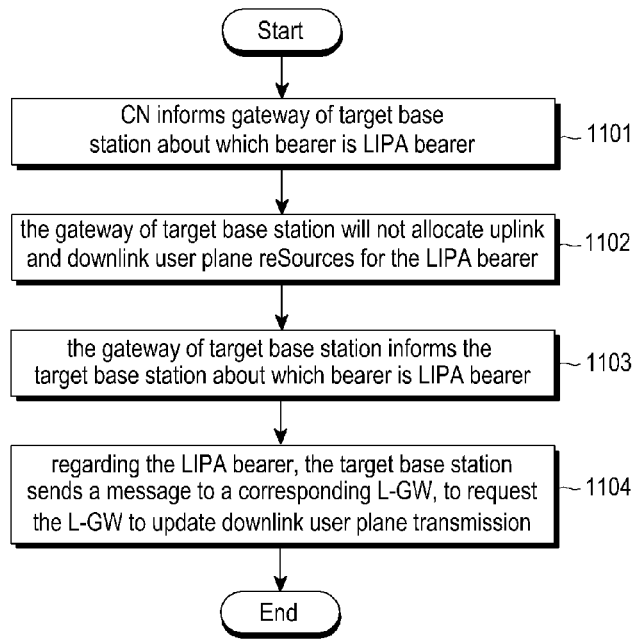
[Fig. 11]

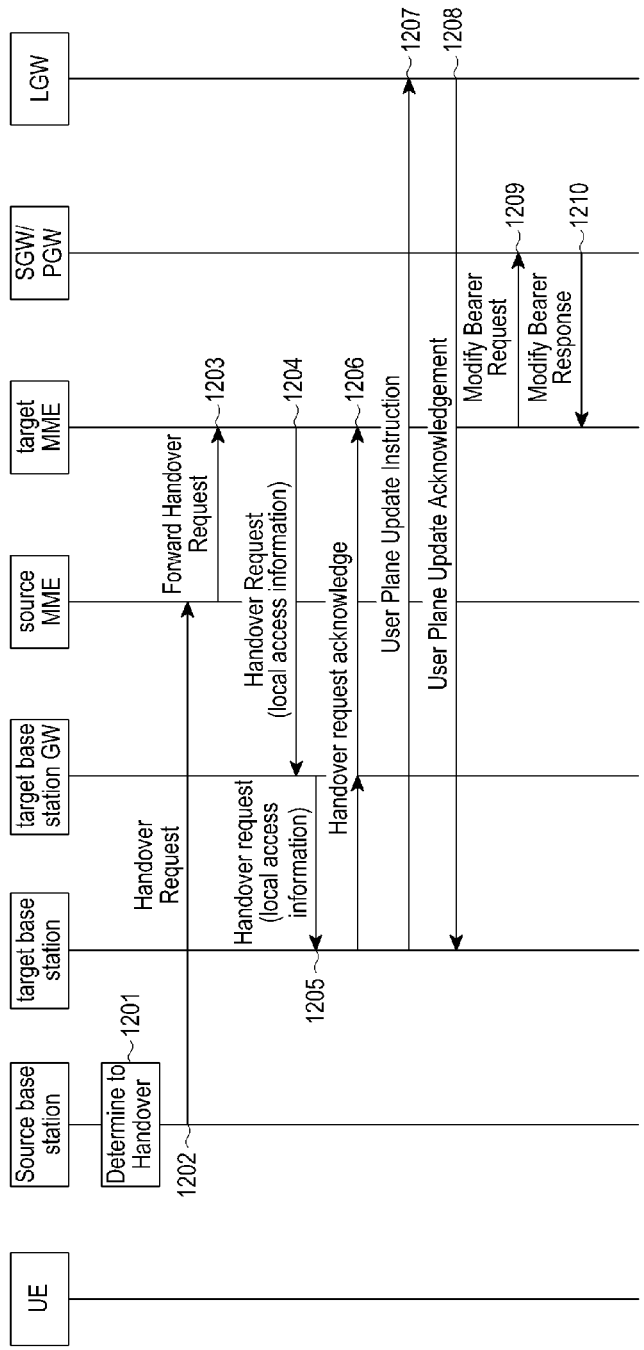
[Fig. 12]

[Fig. 13]
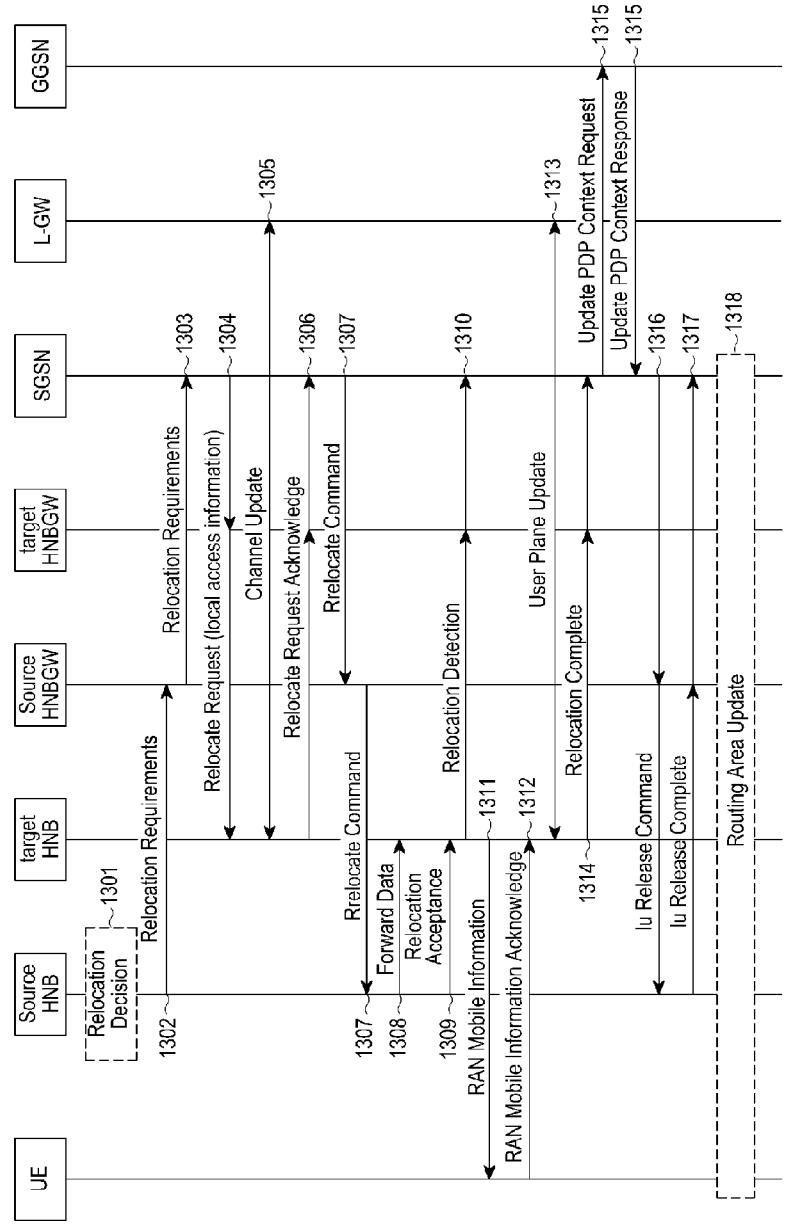
[Fig. 14]
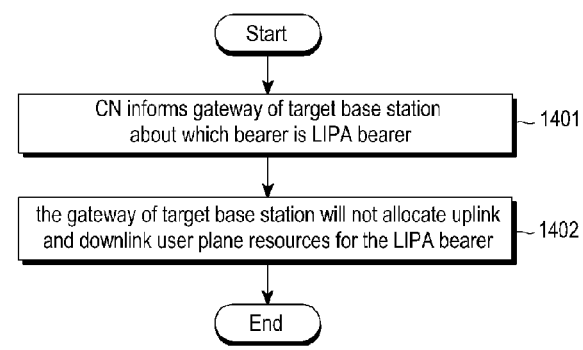

[Fig. 15]
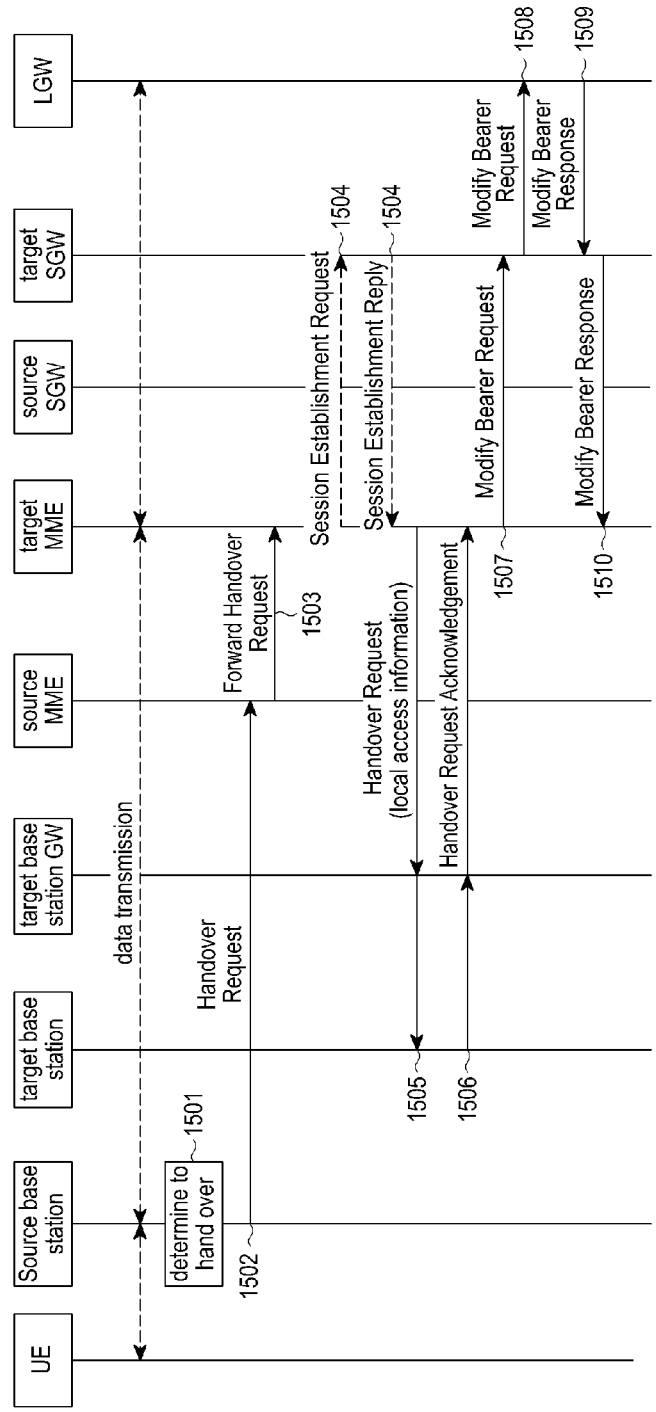

[Fig. 16]
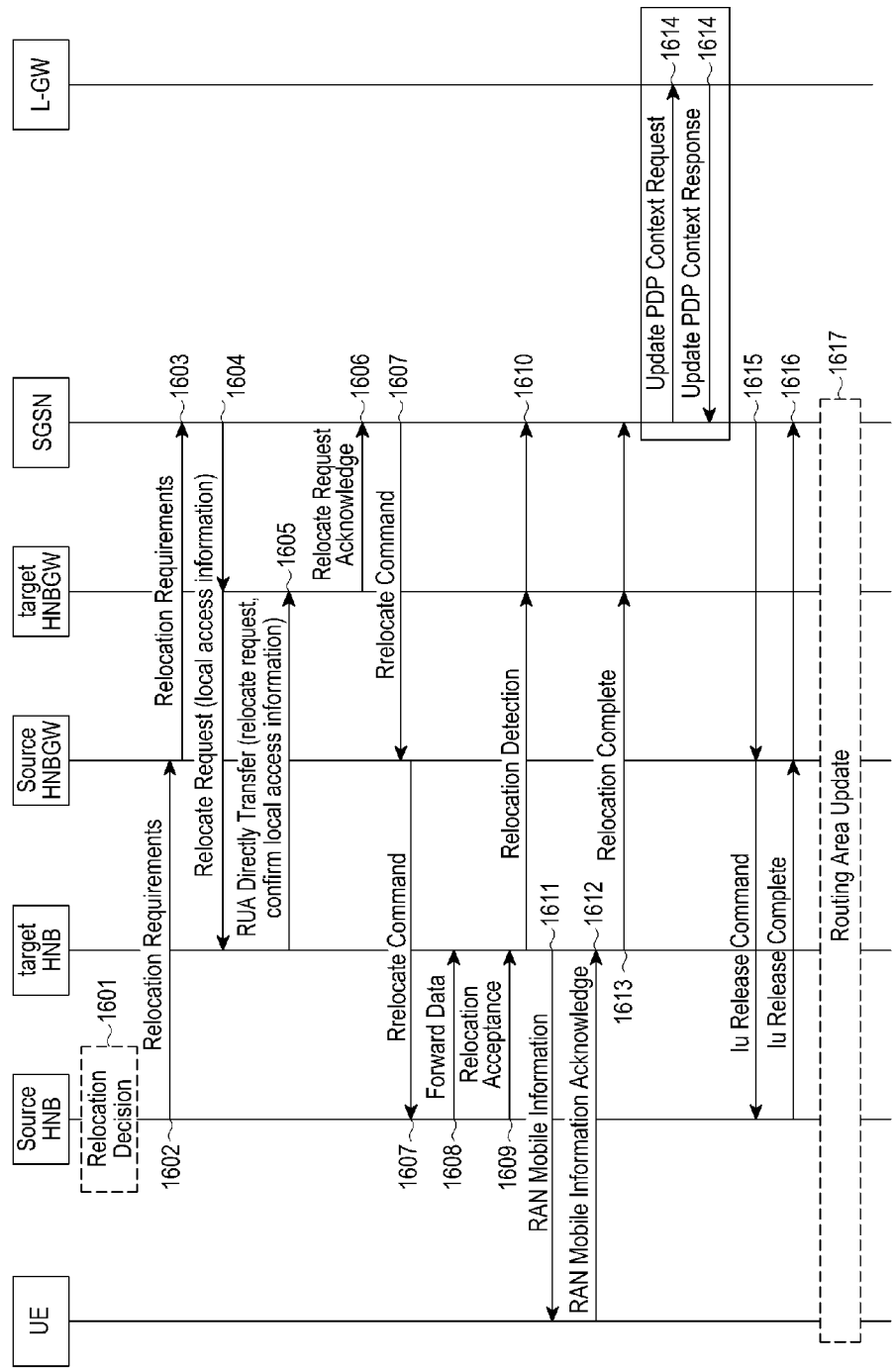

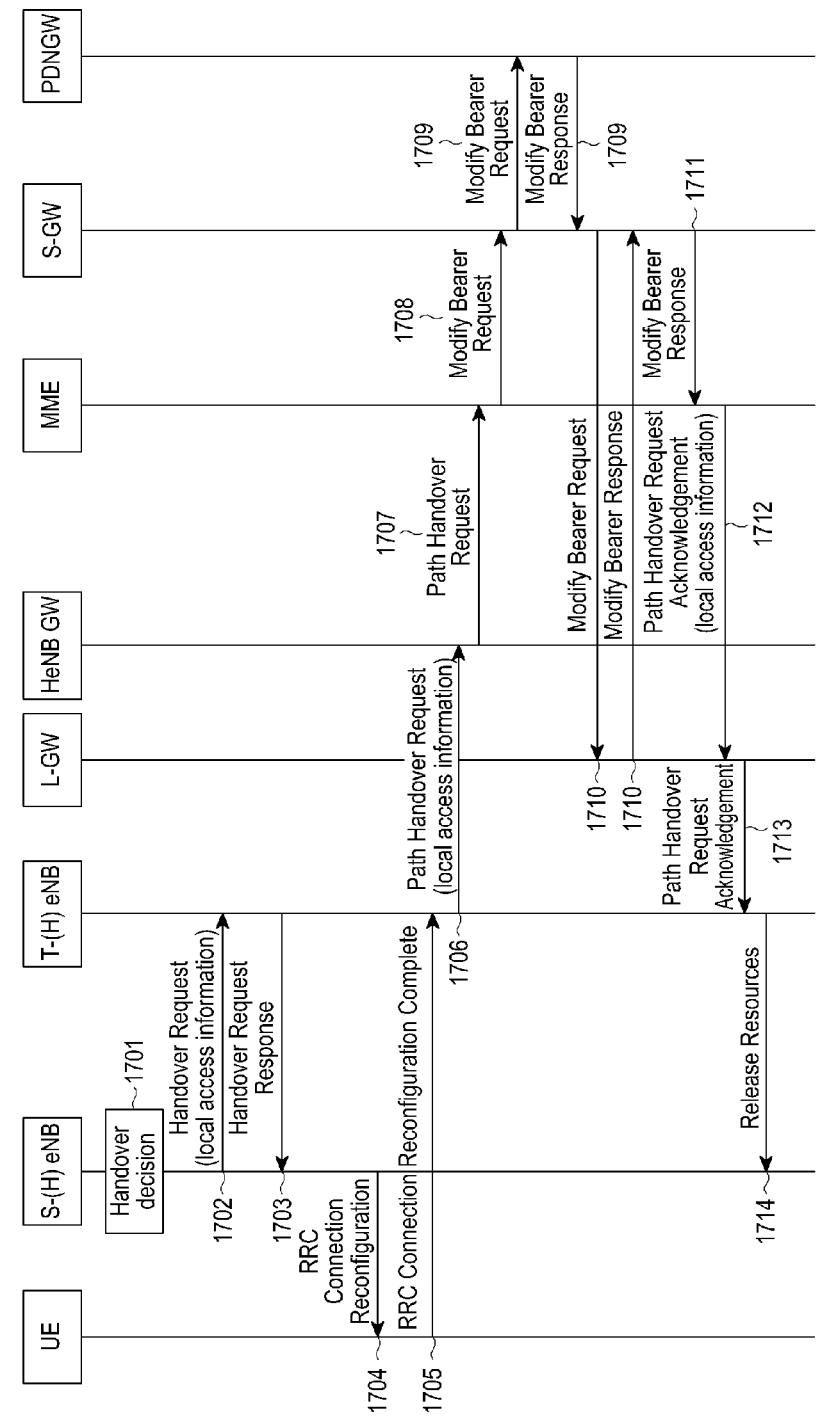
[Fig. 17]

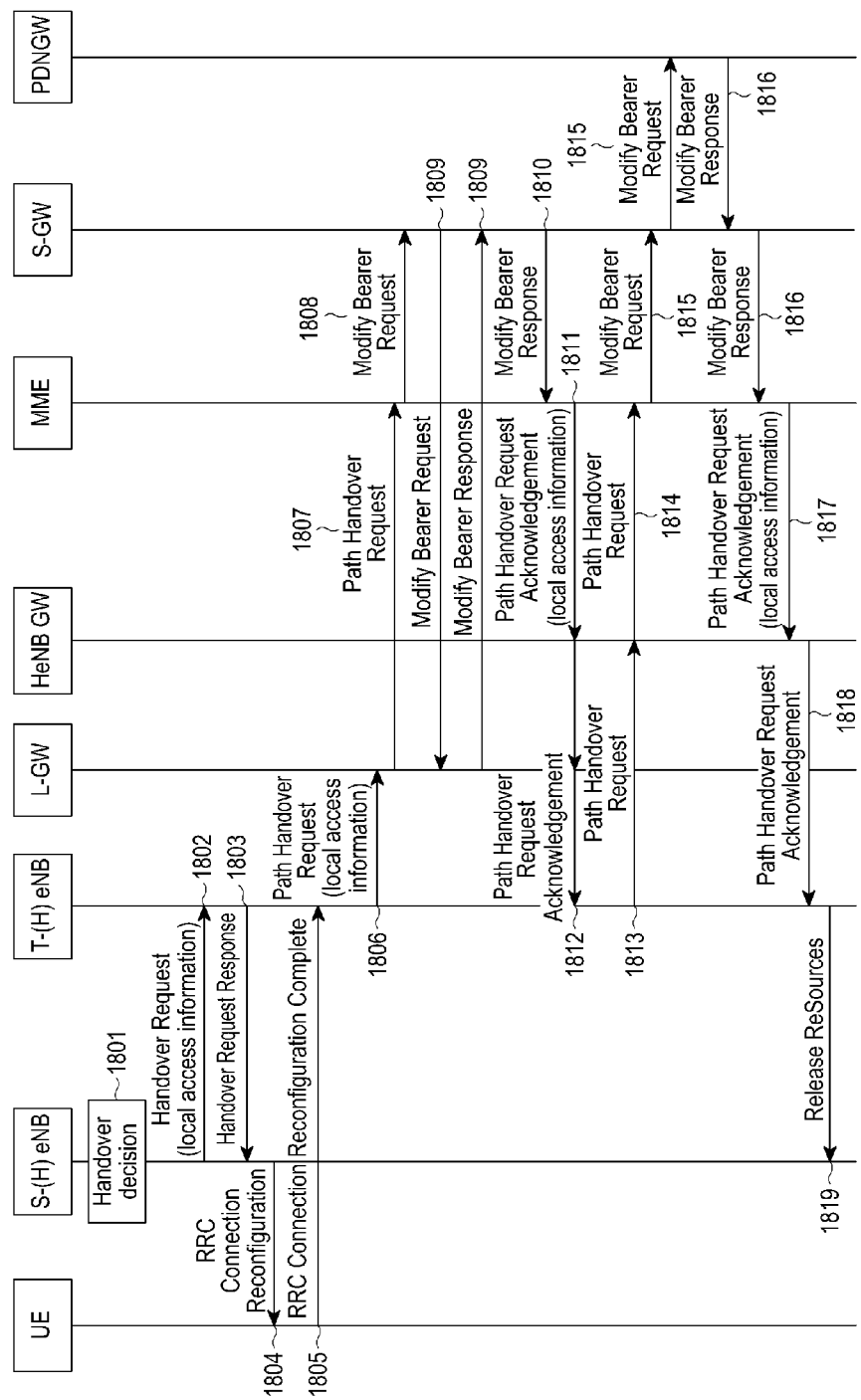
[Fig. 18]

APPARATUS AND METHOD FOR SUPPORTING HANDOVER

TECHNICAL FIELD

The present invention relates to mobile communications technologies, and more particularly, to a method for supporting handover.

BACKGROUND ART

FIG. 1 is a schematic diagram illustrating system architecture of System Architecture Evolution (SAE). User Equipment (UE) 101 is a terminal device configured to receive data. Evolved Universal Terrestrial Radio Access Network (E-UTRAN) 102 is a Wireless Access Network (WAN), which includes an e Node B (eNB) configured to provide an interface for UE, to access a wireless network. Mobile Management Entity (MME) 103 is in charge of managing mobile context, session context and safety information of UE. Serving Gateway (SGW) 104 is mainly configured to provide functions of user plane. MME 103 and SGW 104 may be in the same physical entity. Packet Gateway (PGW) 105 is responsible for functions, such as charging, legal monitoring. The PGW 105 and SGW 104 may also in the same physical entity. Policy and Charging Rule Function (PCRF) 106 provides policies of Quality of Service (QoS) and charging guidelines. Serving General Packet Radio Service (GPRS) Supporting Node (SGSN) 108 is a network node device, configured to provide routing for data transmission in Universal Mobile Telecommunications System (UMTS). Home Subscriber Server (HSS) 109 is a home belonging sub-system, which is in charge of protecting user information, such as current position of user device, address of serving node, user safety information, packet data context of user device.

With the improvement about data rate of UE service, operators have offered a new technology. Selected Internet Protocol (IP) Traffic Offload (SIPTO), that is, when accessing a certain specified service, a UE may switch to an Access Point (AP) closer to a WAN, so as to effectively reduce inputted cost of transmission network, and provide better service experience for high data rate.

3rd Generation Partnership Project (3GPP) puts forward that, a network needs to support SIPTO and Local IP Access (LIPA) capabilities. In the SIPTO, when a UE accesses the Internet or other external networks, via Home Evolved Node B (HeNB), Home Node B (HNB) or Macro Base Station, the network may select or re-select a user plane node closer to the WAN for the UE. The LIPA refers to that, a UE accesses a home network or enterprise internal network via the HeNB or HNB. When executing the LIPA, it may also select or re-select a user plane node closer to the HNB, or a user plane node located in an access network of HeNB/HNB for the UE. The user plane node may be a core network device or gateway. Regarding the SAE system, the user plane node may be SGW, or PGW or Local Gateway (LGW). Regarding the UMTS system, the user plane node may be SGSN or Gateway GPRS Supporting Node (GGSN).

FIG. 2 is a schematic diagram illustrating three kinds of system architectures about R11 LIPA. FIG. 2a is a diagram illustrating architecture of a system supporting HeNB evolution. FIG. 2b is a schematic diagram illustrating a system supporting HNB.

An interface between the HeNB/HNB and the LGW is Sxx interface. There may be two possibilities of protocol stack currently supported by the Sxx interface.

The first possibility: the Sxx interface simultaneously supports control plane and user plane protocols, such as GPRS Tunneling Protocol for control plane (GTP-C) and GPRS Tunneling Protocol for User Plane (GTP-U).

The second possibility: the Sxx interface supports user plane protocol, such as GTP-U protocol.

FIG. 2c is a schematic diagram illustrating another network architecture of R11 LIPA. In the architecture, the L-GW is in a tunnel directly connected the HeNB with the MME. There is an Si interface between the L-GW and HeNB. Also, there is the Si interface between the L-GW and the HeNB GW.

FIG. 3 is a flowchart illustrating handover in existed Long Term Evolution (LTE) system. As shown in FIG. 3, the flow mainly includes the following blocks.

Block 301: a source base station determines to hand over.

Block 302: the source base station sends a Handover Request to a source MME, which includes information about target base station, such as target base station ID, target Tracking Area ID (TAI). The Handover Request may also include information, such as target Closed Subscriber Group (CSG) or handover type.

Block 303: the source MME sends a Forward Handover Request to a target MME, which includes information, such as information about target base station obtained from the Handover Request.

Block 304: when the target MME re-selects a SGW for the UE, the target MME executes a session establishment process with the re-selected target SGW.

When it is not necessary to re-select the SGW for the UE, it is not necessary to proceed with block 304.

Block 305: the target MME sends a Handover Request to the target base station.

Block 306: the target base station replies a Handover Request Acknowledge to the target MME.

Block 307: the target MME updates bearing information, according to the target base station about UE handover, which may include the follows. Establish a user plane tunnel between the target base station and the PGW.

When supporting the continuity of LIPA service, in above existed handover process, the following problems are existed, how to establish a user plane between a target base station and L-GW. More specifically, it includes the following problems.

The first problem, for example, when supporting the first architecture of LIPA (the Sxx interface simultaneously supports control plane and user plane protocols), how does the target base station learn to update downlink user plane to HeNB GW/MME or to send a signaling to the L-GW.

The second problem, when supporting the second architecture (the Sxx interface supports the user plane protocol), after receiving uplink and downlink bearer establishment information, the target base station GW may allocate uplink and downlink Tunnel Endpoint Identifier (TEID) and Transport Network Layer (TNL) address for each bearer. Thus, establishment of a direct tunnel between base station and L-GW cannot be guaranteed.

The third problem, when supporting the architecture illustrated in FIG. 2c, how to establish a user plane through the target base station for the UE.

Above descriptions are provided taken Si handover as an example, during X2 handover, the problem about how to establish a direct tunnel between target HeNB and L-GW is also existed.

In the embodiments of the invention, solutions are provided respectively for three kinds of possible architectures.

Currently existed problems are described in the foregoing taken an LTE system as an example. There are the same problems in the UMTS, and more particularly, to whether optimized relocation process is supported during moving of a UE supporting LIPA service. In existed 3G system, optimized relocation process may refer to FIG. 4. As shown in FIG. 4, the process mainly includes the follows.

Block 401: a source HNB sends an RNA Connect or RNA Directly Transfer to a target HNB. The RNA Connect or RNA Directly Transfer includes an enhanced relocation request message about Radio Network Subsystem Application Part (RNSAP) message.

Block 402: the target HNB updates Transport Network Layer (TNL) information about a Radio Access Bearer (RAB) needing relocation. The target HNB sends a Home Node B Application Part (HNBAP) TNL Update Request to a Home Node B Gateway (HNB GW). The HNB GW sends a HNBAP TNL Update Response to the HNBAP.

Block 403: the target HNB sends an RNA Directly Transfer to the source HNB. The RNA Directly Transfer includes an RNSAP Enhanced Relocation Response, which may be used for informing the source HNB that preparation for relocation is successful.

Block 404: the source HNB sends an RNA Directly Transfer to the target HNB, to accept relocation preparations. The RNA Directly Transfer includes an RNSAP Relocation Acceptance, which includes information auxiliary for the relocation process.

Block 405: the source HNB reconfigures the UE to start the relocation process.

Block 406: physical layer synchronization between the UE and target HNB is achieved. The UE has completed a Radio Resource Control (RRC) reconfiguration process. The UE sends a Radio Bearer (RB) Reconfiguration Complete to the target HNB.

Block 407: the target HNB issues an instruction to the HNB GW UE, to indicate that the relocation has been completed successfully. The target HNB sends an HNBAP UE Relocation Complete to the HNB GW. The HNB GW hands over from user plane to target HNB.

Block 408: the HNB GW sends an HNBAP UE De-registration to the source HNB, to indicate successful RNSAP relocation.

Block 409: the source HNB sends an RNA Disconnect to the target HNB, which includes an RNSAP Enhanced Relocation Signaling Transfer, configured to transmit L3 information received by the source HNB during relocation process. The source base station releases resources for the UE.

When the source base station connects with the target base station via an HNB GW with Iurh connection, the RNA message may be routed with the HNB GW.

DISCLOSURE OF INVENTION

Technical Problem

The above optimized relocation process is used in interior of a same HNB GW, and moving among HNBs within a same CSG. When supporting the LIPA bearer, how to execute intraCSG, intra-HNB GW relocation process, it is not necessary for the SGSN to execute the relocation process. How to establish a user plane between the HNB and L-GW in the two kinds of architectures corresponding to above FIG. 3, is a problem to be solved in the prior art.

Solution to Problem

In view of above, embodiments of the invention provide a method for supporting handover, so as to establish a correct user plane transmission for a User Equipment (UE), and to ensure successful handover.

To achieve above objectives, the technical solution provided by embodiments of the invention are implemented as follows.

A method for supporting handover, including:
informing a target base station, by a source base station, which bear in bearers to be handed over is a Local Internet Protocol (IP) Access (LIPA) bearer;
regarding the LIPA bearer, sending, by the target base station, a message to a corresponding Local Gateway (L-GW), to request the L-GW to update downlink user plane transmission.

The method further includes:
regarding a non-LIPA bearer, sending, by the target base station, a message to its uplink node, to update the downlink user plane transmission.

Informing the target base station by the source base station which bearer in the bearers to be handed over is the LIPA bearer, is implemented by using local access information.

In the embodiment, the source base station informs the target base station LIPA bearers in the bearers to be handed over. Subsequently, the target base station sends a message to a corresponding L-GW, to request the L-GW to update downlink user plane transmission. Therefore, by adopting the method provided by the embodiment of the invention, a correct user plane transmission may be established for a UE, and successful handover may be guaranteed.

A method for supporting handover, including:
informing a target base station, by a source base station, which bearer in bearers to be handed over is a LIPA bearer, uplink Tunnel Endpoint Identifier (TEID) and Transport Network Layer (TNL) address allocated by an L-GW;
informing a target base station gateway (GW), by the target base station, which bear in the bearers to be handed over is the LIPA bearer;
wherein regarding the LIPA bearer, the target base station GW doesn't allocate uplink and downlink user plane transmission resources; in a downlink, the target base station GW sends the TEID and TNL address allocated by the base station to an uplink node; in an uplink, the target base station GW sends an uplink TEID and TNL address, received from a Mobile Management Entity (MME) or a Serving General Packet Radio Service (GPRS) Supporting Node (SGSN), to the target base station.

Informing the target base station by the source base station which bearer in the bearers to be handed over is the LIPA bearer, is implemented with local access information.

In the embodiment, the source base station informs the target base station LIPA bearers in the bearers to be handed over, uplink TEID and TNL address allocated by the L-GW. Subsequently, the target base station informs the target base station GW the above information received. In the downlink, the target base station GW sends the TEID and TNL addresses, allocated by the base station, to an uplink node. In the uplink, the target base station GW sends uplink TEID and TNL address, received from the MME or SGSN, to the target base station.

A method for supporting handover, including:
informing a target base station GW, by a Core Network (CN), which bearer in bearers to be handed over is a LIPA bearer;
informing a target base station, by the target base station GW, which bearer in the bearers to be handed over is the LIPA bearer;

regarding the LIPA bearer, sending, by the target base station, a message to a corresponding L-GW, to request to update downlink user plane transmission.

Informing the target base station GW by the CN, which bearer in the bearers to be handed over is the LIPA bearer, is implemented with local access information; and informing the target base station by the target base station GW which bearer in the bearers to be handed over is the LIPA bearer, is implemented with the local access information.

In the embodiment, the CN informs the target base station GW the LIPA bearers in bearers to be handed over. Subsequently, the target base station GW informs the target base station the LIPA bearers in the bearers to be handed over. Corresponding to the LIPA bearers, the target base station sends a message to a corresponding L-GW, to request to update downlink user plane transmission. Therefore, by adopting the method provided by the embodiment, a correct user plane transmission may be established for the UE, and successful handover may be guaranteed.

A method for supporting handover, including:

informing a target base station GW, by a CN, which bear in bearers to be handed over is a LIPA bearer, uplink TEID and TNL address of the LIPA bearer;

regarding the LIPA bearer, sending, by the target base station GW, the TEID and TNL address, received from the CN, to a target base station.

Informing the target base station GW by the CN which bear in the bearers to be handed over is the LIPA bearer, the uplink TEID and TNL address of the LIPA bearer, is implemented with local access information; and the target base station GW sends the TEID and TNL address, received from the CN, to the target base station with the local access information.

In the embodiment, the CN informs the target base station GW the LIPA bearers in bears to be handed over, uplink TEID and TNL address of the LIPA bearers. Corresponding to the LIPA bearers, the target base station GW sends the TEID and TNL address, received from the CN, to the target base station.

A method for supporting handover, including:

informing a target base station, by a source base station, which bearer in bearers to be handed over is a LIPA bearer; and informing an L-GW, by the target base station, which bearer in the bearers to be handed over is the LIPA bearer.

The method further includes:

informing a target base station GW, by the L-GW, which bear in the bearers to be handed over is the LIPA bearer;

regarding the LIPA bearer, sending, by the target base station GW, a TEID and TNL address, allocated by a base station, to its uplink node.

Informing the target base station by the source base station which bearer in the bearers to be handed over is the LIPA bearer, is implemented with local access information;

informing the L-GW by the target base station which bearer in the bearers to be handed over is the LIPA bearer, is implemented with the local access information; and informing the target base station GW by the L-GW which bear in the bearers to be handed over is the LIPA bearer, is implemented with the local access information.

The method further includes:

sending, by a MME, a Path Switch Request Acknowledgement to the target base station GW, to indicate which bearer is the LIPA bearer, wherein the Path Switch Request Acknowledge comprises local access information.

The method further includes:

sending, by the target base station GW, the Path Switch Request Acknowledgement to the L-GW, to indicate which bearer is the LIPA bearer, wherein the Path Switch Request Acknowledgement comprises the local access information.

In the embodiment, the source base station informs the target base station the LIPA bearers in the bearers to be handed over, by using local access information. Subsequently, the target base station informs the L-GW the LIPA bearers in the bearers to be handed over, by using the local access information.

BRIEF DESCRIPTION OF DRAWINGS

FIG. 1 is a schematic diagram illustrating structure of an existed SAE system.

FIG. 2a is a schematic diagram illustrating architecture of a system supporting HeNB evolution.

FIG. 2b is a schematic diagram illustrating architecture of a system supporting HNB.

FIG. 2c is a schematic diagram illustrating three kinds of network architectures of R11 LIPA.

FIG. 3 is a handover flowchart adopted in the prior art.

FIG. 4 is a schematic diagram illustrating optimized relocation process existed.

FIG. 5 is a work flowchart illustrating a first method for supporting handover, in accordance with an embodiment of the invention.

FIG. 6 is a work flowchart illustrating a first embodiment of the invention, in which handover is supported.

FIG. 7 is a work flowchart illustrating a second embodiment of the invention, in which handover is supported.

FIG. 8 is a work flowchart illustrating a second method for supporting handover, in accordance with an embodiment of the invention.

FIG. 9 is a work flowchart illustrating a third embodiment of the invention, in which handover is supported.

FIG. 10 is a work flowchart illustrating a fourth embodiment of the invention, in which handover is supported.

FIG. 11 is a work flowchart illustrating a third method for supporting handover, in accordance with an embodiment of the invention.

FIG. 12 is a work flowchart illustrating a fifth embodiment of the invention, in which handover is supported.

FIG. 13 is a work flowchart illustrating a sixth embodiment of the invention, in which handover is supported.

FIG. 14 is a work flowchart illustrating a fourth method for supporting handover, in accordance with an embodiment of the invention.

FIG. 15 is a work flowchart illustrating a seventh embodiment of the invention, in which handover is supported.

FIG. 16 is a work flowchart illustrating an eighth embodiment of the invention, in which handover is supported.

FIG. 17 is a work flowchart illustrating a ninth embodiment of the invention, in which handover is supported.

FIG. 18 is a work flowchart illustrating a tenth embodiment of the invention, in which handover is supported.

MODE FOR THE INVENTION

To solve problems existed in the prior art, an embodiment of the invention provides a method for supporting handover. That is, a source base station informs a target base station which bearer in the bearers to be handed over is LIPA bear. Regarding the LIPA bearer, the target base station sends a message to a corresponding L-GW, to request the L-GW to update downlink user plane transmission, so as to enable to correctly establish a user plane during handover process, and guarantee continuity of LIPA services.

Based on above introductions, specific implementation of solution provided by embodiments of the invention mainly includes the follows.

The source base station informs the target base station which bearer in the bearers to be handed over is LIPA bearer. Regarding the LIPA bearer, the target base station sends a message to a corresponding L-GW, to request the L-GW to update downlink user plane transmission, or the source base station informs the target base station which bearer in the bearers to be handed over is LIPA bearer, uplink TEID and TNL address allocated by the L-GW. The target base station informs the base station GW which bearer in the bearers to be handed over is LIPA bearer. Regarding the LIPA bearer, in the downlink, the base station GW sends the TEID and TNL address, allocated by the base station, to an uplink node. In the uplink, the base station GW sends an uplink TEID and TNL address, received from an MME or SGSN, to the target base station, or a CN informs the target base station GW which bearer in the bearers to be handed over is LIPA bearer. The target base station GW informs the target base station which bearer in the bearers to be handed over is LIPA bearer. Corresponding to the LIPA bearers, the target base station sends a message to a corresponding L-GW, to request to update downlink user plane transmission, or the CN informs the target base station GW which bearer in the bearers to be handed over is LIPA bearer, an uplink TEID and TNL address of the LIPA bearers. The target base station GW sends the TEID and TNL address, received from the CN, to the target base station, or the source base station informs the target base station which bearer in the bearers to be handed over is LIPA bearer, by using local access information. The target base station informs the L-GW which bearer in the bearers to be handed over is LIPA bearer, by using the local access information.

To make objectives, technical solutions and advantages of the invention more clear, detailed descriptions of the invention are further provided in the following, accompanying with attached figures and embodiments.

FIG. 5 is a work flowchart illustrating a first method for supporting handover, in accordance with an embodiment of the invention. As shown in FIG. 5, the process includes the follows.

Step 501: a source base station informs a target base station which bearer in the bearers to be handed over is LIPA bearer.

Specific informing modes may be as follows. Introduce local access information to E-UTRAN Radio Access Bearer (E-RAB) information corresponding to the LIPA bearer. When such instruction is existed, it means that the corresponding bearer is LIPA bearer. An uplink GTP tunnel endpoint corresponding to the bearer is an IP address of L-GW and TEID allocated by the L-GW. When such instruction is not existed, it means that the bearer is a non-LIPA bearer. It may also directly introduce TEID of new information element L-GW and IP address of the L-GW, or GRE key and IP address of the L-GW, to the E-RAB information corresponding to the LIPA bearer, to indicate the LIPA bearer. It may also directly introduce the TEID of new information element L-GW or GRE key to the E-RAB information corresponding to the LIPA bearer, to indicate the LIPA bearer. When above E-RAB information includes the TEID of new L-GW or GRE key, TNL address in corresponding uplink GTP tunnel endpoint is the IP address of the L-GW. Other informing modes may be feasible, which will not affect main contents of the invention.

Step 502: regarding the LIPA bearer, the target base station sends a message to a corresponding L-GW, in which the message includes address information of the target base station and GTP tunnel information, to request the L-GW to hand over downlink user plane transmission tunnel. That is, to hand over downlink GTP tunnel endpoint from the source base station to the target base station.

Step 503: regarding a non-LIPA bearer, the target base station sends a message to its uplink node, such as HeNB GW, MME, HNB GW, or SGSN, to update the downlink user plane transmission.

Thus, the whole work process of the first method for supporting handover, which is provided by an embodiment of the invention, is completed. In the embodiment, the source base station informs the target base station which bearer in the bearers to be handed over is LIPA bearer. Subsequently, the target base station sends a message to a corresponding L-GW, to request the L-GW to update downlink user plane transmission. Therefore, by adopting the method of the embodiment, correct user plane transmission may be established for the UE, and successful handover may be guaranteed.

Based on the above method, FIG. 6 provides a work flowchart of a first embodiment of the invention, in which handover is supported by an LTE system. As shown in FIG. 6, the process includes the follows.

Step 601: S—HeNB makes a handover decision.

Step 602: the S—HeNB sends a Handover Request to T-HeNB, to inform the T-HeNB which bearer in the bearers to be handed over is LIPA bearer.

Specific informing modes may be as follows. Introduce local access information to E-UTRAN Radio Access Bearer (E-RAB) information corresponding to the LIPA bearer. When such instruction is existed, it means that the corresponding bearer is LIPA bearer. An uplink GTP tunnel endpoint corresponding to the bearer is an IP address of L-GW and TEID allocated by the L-GW. When such instruction is not existed, it means that the bearer is a non-LIPA bearer. It may also directly introduce TEID of new information element L-GW and IP address of the L-GW, or GRE key and IP address of the L-GW, to the E-RAB information corresponding to the LIPA bearer, to indicate the LIPA bearer. It may also directly introduce the TEID of new information element L-GW or GRE key to the E-RAB information corresponding to the LIPA bearer, to indicate the LIPA bearer. When above E-RAB information includes the TEID of new L-GW or GRE key, TNL address in corresponding uplink GTP tunnel endpoint is the IP address of the L-GW. Other informing modes may be feasible, which will not affect main contents of the invention.

Step 603: the T-HeNB sends a Handover Request Response to the S—HeNB.

Step 604: the T-HeNB sends a Tunnel Update Request to L-GW, according to the local access information, to update downlink tunnel information of the LIPA bearer.

In the step, one HeNB may connect to multiple L-GWs. In this case, the T-HeNB may find the L-GW, according to the IP address of the L-GW in the LIPA bearer in step 602. The message includes TEID of downlink user plane and TNL address allocated by the T-HeNB in the LIPA bearer to be updated. Furthermore, the L-GW sends a Tunnel Update Response to the T-HeNB. The message may also include uplink TEID and TNL address allocated by the L-GW. The TEID and TNL address allocated by the uplink L-GW may also be informed to the target base station by the source base station. Alternatively, the target base station may directly obtain them from the L-GW in the step.

It should be noted that, this step is optional. In the method provided by embodiments of the invention, this step may be included or not included.

Step 605: the S—HeNB sends an RRC Connection Reconfiguration to UE, to request the UE to hand over.

Step 606: after handing over, the UE sends an RRC Connection Reconfiguration Complete to the T-HeNB.

Step 607: based on the local access information and corresponding to the LIPA bearer, the T-HeNB sends a User Plane Update Instruction to a corresponding L-GW.

One HeNB may connect to multiple L-GWs. In this case, the T-HeNB may find the corresponding L-GW, according to the TNL address in uplink GTP tunnel endpoint of the LIPA bearer in step 1802. The message may include TEID and TNL address of the downlink user plane to be updated. The L-GW hands over transmission tunnel of the downlink user plane. That is, hand over the downlink user plane transmission from a tunnel allocated by the source base station to a downlink tunnel allocated by the target base station.

Step 608: the L-GW sends a User Plane Update Acknowledgement to the T-HeNB.

The message includes bearers successfully updated and bearers un-successfully updated. The message may also include uplink TEID and TNL address allocated by the L-GW. The source base station may inform the target base station the TEID and TNL address allocated by the uplink L-GW. Alternatively, the target base station may also directly obtain them from the L-GW in the step.

It should be noted that, this step is optional. In the method provided by embodiments of the invention, this step may be included or not included.

It should be noted that, in the method provided by embodiments of the invention, when the UE in handover only possesses LIPA bearers without non-LIPA bearers, it may directly proceed with step 613 and 609. When the UE under handover simultaneously hands over LIPA bearers and non-LIPA bearers, it is necessary to proceed with step 609. Corresponding to the non-LIPA bearer, it may directly proceed with the method in step 613. The handover process may be terminated in an access network or a local network.

Step 609: the T-HeNB sends a Path Switch Request to an MME.

When there is the HeNB GW deployed, the T-HeNB sends a Path Switch Request to the MME via the HeNB GW. The Path Switch Request includes information about all the E-RABs necessary to be handed over by the UE, or only includes E-RAB information about non-LIPA bearer. When the Path Switch Request includes information about all the E-RABs necessary to be handed over, the T-HeNB may inform the HeNB GW which bear is LIPA bearer. Thus, the HeNB GW is not necessary to allocate uplink and downlink user plane transmission resources for the LIPA bearers.

Step 610: the MME sends a Modify Bearer Request to S-GW/Packet Data Network Gateway (PDN GW).

The message includes downlink user plane information about all the bearers to be handed over for the UE, or only includes the downlink user plane information of non-LIPA bearers. The downlink user plane information includes IP address and TEID of base station.

Step 611: after modifying the UE bearers, the S-GW/PDN GW may send a Modify Bearer Response to the MME.

Step 612: the MME sends a Path Switch Request Acknowledgement to the HeNB.

When there is the HeNB GW deployed, the MME may send a Path Switch Request to the T-HeNB via the HeNB GW.

Step 613: after receiving the Path Switch Request Acknowledgement, the T-HeNB may send a Release Resource to the S—HeNB.

Based on the first method mentioned above, FIG. 7 provides a work flowchart illustrating an embodiment of the invention, in which handover is supported by a UMTS system. As shown in FIG. 7, the process includes the follows.

Step 701: a source HNB sends an RNA Connect or RNA Directly Transfer to a target HNB.

In the step, the RNA Connect or RNA Directly Transfer may include an RNSAP Enhanced Relocation Request, which includes the local access information, configured to inform the target base station which bearer is LIPA bearer. In the embodiment, there are two methods for the source base station to inform the target base station.

The first method: introduce an instruction including LIPA bearer to the RNSAP message.

Corresponding to the LIPA bearer, the message includes IP address and TEID of the uplink L-GW. The instruction about LIPA bearer may be explicit or implicit. When it is implicit, for example, the TEID or GRE key allocated by new information element L-GW, and/or, IP address of the L-GW, may be adopted to inform the target base station that the bearer is LIPA bearer.

The second method: inform the target base station which bearer is LIPA bearer, and which bearer is non-LIPA bearer, with the RNA message.

For example, when there are 5 bearers, the RNA message may include an information element, which may be a bit string. Each digit therein respectively indicates whether each bearer in the 5 bearers of the RNSAP message is LIPA bearer. Same as sequence of the bearers, value of the bit string is in a one-to-one correspondence.

The message may also include the uplink TEID and TNL address of the LIPA bearer. The uplink TEID is allocated by the L-GW. The TNL address denotes TNL address of the L-GW.

Step 702: the target HNB sends a HNBAP TNL Update Request to the HNB GW, to update TNL information about an RAB to be relocated.

Furthermore, in the step, the HNB GW sends a HNBAP TNL Update Response.

In the step, the RAB to be relocated may be all the RABs or non-LIPA bearers.

Step 703: based on the local access information, the T-HNB sends a tunnel update request to the L-GW, to update the downlink tunnel information of the LIPA bearer.

One HNB may connect to multiple L-GWs. In this case, the T-HNB may find a corresponding L-GW, according to the TNL address in uplink transmission layer information of source end Iu about LIPA bearer in step 701. The message includes information about TEID and TNL address of downlink user plane allocated by the T-HNB, for the LIPA bearer to be updated. Furthermore, the L-GW sends a tunnel update response to the T-HNB. The message may also include uplink TEID and TNL address of the LIPA bearer. The uplink TEID is allocated by the L-GW. The TNL address denotes the TNL address of the L-GW.

The source base station may inform the target base station the TEID and TNL address allocated by the uplink L-GW. Alternatively, the target base station may directly obtain them from the L-GW.

The step is optional, which may be included or not included in the method provided by embodiments of the invention.

Step 704: the target HNB sends an RNA directly transfer message to the source HNB, which includes an RNSAP enhanced relocation response.

The message may be used for informing the source HNB that preparations for the relocation is successful.

Step 705: the source HNB sends an RNA directly transfer message to the target HNB, to enable the target HNB to accept the preparations for the relocation. The RNA directly transfer message includes an RNSAP relocation acceptance and information auxiliary for the relocation process.

Step 706: the source HNB reconfigures the UE to start the relocation process.

Step 707: physical layer synchronization is achieved between the UE and the target HNB.

The UE sends an RB reconfiguration complete message to the target HNB, to complete the RRC reconfiguration process.

Step 708: the target HNB sends HNBAP UE relocation complete to the HNB GW, to indicate that the HNB GW UE has completed the relocation successfully.

Above step may only be executed when non-LIPA bearer is existed, or no matter whether non-LIPA bearer is existed.

Step 709: based on the local access information, corresponding to the LIPA bearer, the T-HNB sends user plane update instruction to a corresponding L-GW.

One HNB may connect to multiple L-GWs. In this case, the T-HNB may find a corresponding L-GW, according to the TNL address in uplink transmission layer information of source end Iu about LIPA bearer in step 701. The message may include TEID and TNL address of downlink user plane to be updated. The L-GW hands over transmission tunnel of the downlink user plane. That is, the L-GW hands over the downlink user plane transmission from a tunnel allocated by the source base station to a downlink tunnel, which is allocated by the target base station.

Step 710 is similar to step 608, which is not repeated here.

Step 711: the HNB GW sends HNBAP UE de-registration to the source HNB, to indicate successful RNSAP relocation.

Step 712: the source HNB sends RNA disconnect to the target HNB. The RNA disconnect includes RNSAP enhanced relocation signaling transfer, which is used for transmitting L3 information received by the source HNB, during the relocation process.

When the source base station connects to the target base station via the HNB GW with an Iurh connection, the RNA message may be routed via the HNB GW.

Above optimized relocation process is used in the interior of the same HNB GW, and moving among HNBs within the same CSG. When supporting the LIPA bearer, the relocation process may also be executed without the SGSN.

FIG. 8 is a work flowchart illustrating a second method for supporting handover, in accordance with an embodiment of the invention. As shown in FIG. 8, the process includes the follows.

Step 801 is similar to step 501, which is not repeated here.

Step 802: a target base station informs base station GW which bearer is LIPA bearer.

Specific informing modes may be as follows. Introduce local access information to the E-RAB information corresponding to the LIPA bearer. When such instruction is existed, it means that the corresponding bearer is LIPA bearer. Uplink GTP tunnel endpoint corresponding to the bearer is IP address of the L-GW and TEID allocated by the L-GW. When such instruction is not existed, it means that the corresponding bearer is a non-LIPA bearer. Other informing modes may be feasible, which will not affect main contents of the invention.

Step 803: regarding the LIPA bearer, the base station GW will not allocate uplink and downlink user plane. Regarding the downlink, the base station GW directly sends TEID and TNL address allocated by the base station to its uplink node, e.g., MME or SGSN. Regarding the uplink, the base station GW directly sends the uplink TEID and TNL address, received from the MME or SGSN, to the base station.

Thus, the whole work flowchart about the second method for supporting handover, in accordance with an embodiment of the invention, is completed. In the embodiment, the source base station informs the target base station LIPA bearers in the bearers to be handed over, uplink TEID and TNL address allocated by the L-GW. Subsequently, the target base station informs the target base station GW such information. Regarding the downlink, the target base station GW sends the TEID and TNL address, allocated by the base station, to its uplink node. Regarding the uplink, the target base station GW sends the uplink TEID and TNL address, received from the MME or the SGSN, to the target base station.

Based on the method in the embodiment, FIG. 9 provides a work flowchart of an embodiment in the invention, in which handover is supported by an LTE system. As shown in FIG. 9, the process include the follows.

Steps 901 to 903 are similar to steps 601 to 603, which are not repeated here.

Steps 904 to 905 are similar to steps 605 to 606, which are not repeated here.

Step 906: the T-HeNB sends a path Switch request message to the HeNB GW, to inform the HeNB GW which bearer in the bearers to be handed over is LIPA bearer.

Specific informing modes may be as follows. Introduce local access information to the E-RAB information corresponding to the LIPA bearer, configured to indicate to the HeNB GW that which bearer is LIPA bearer. Corresponding to the LIPA bearer, the base station GW will not allocate downlink user plane. Instead, the base station GW directly sends TEID and TNL address allocated by the base station to its uplink node MME.

Step 907: the HeNB GW sends a path Switch request message to the MME.

Corresponding to the LIPA bearer, the E-RAB information to be handed over in the downlink, carried in the above message, further includes the TEID and corresponding TNL address allocated by the T-HeNB.

It should be noted that, the path Switch request message sent by the HeNB GW to the MME may include or not include the local access information, which is not necessary, because the MME has already learned which bearer is LIPA bearer.

Step 908: the MME sends a modify bearer request message to the S-GW, to inform the S-GW information about which bearer is LIPA bearer.

In the step, the above message includes information about downlink user plane of all the bearers needing to be handed over for the UE. The information about downlink user plane includes IP address and TEID of the target base station.

Step 909: regarding a non-LIPA bearer, the S-GW sends a modify bearer request message to the P-GW. The P-GW sends a modify bearer response to the S-GW.

Step 910: regarding a LIPA bearer, the S-GW will not allocate downlink user plane.

Instead, the S-GW may directly send the TEID and TNL address allocated by the base station to its uplink node L-GW, by using the modify bearer request message.

Furthermore, the L-GW sends a modify bearer response message to the S-GW, to hand over a transmission tunnel of the downlink user plane. That is, to hand over the downlink user plane from a tunnel allocated by the source base station to a downlink tunnel, allocated by the target base station.

Step 911: the S-GW sends a modify bearer response message to the MME.

Corresponding to the LIPA bearer, the S-GW will not allocate uplink user plane.

Instead, the S-GW may directly send the TEID and TNL address allocated by the L-GW to the MME, by using the modify bearer response message.

Step 912: the MME sends a Path Switch Request Acknowledgement to the HeNB GW, to inform the HeNB GW which bear in the bearers to be handed over is LIPA bearer.

In the step, specific informing modes may be as follows. Introduce the local access information to the E-RAB information corresponding to the LIPA bearer, to indicate which bearer is LIPA bearer.

Furthermore, in the step, the message doesn't include the local access information. Instead, the HeNB GW may learn which bearer is LIPA bearer, according to stored information after receiving the message sent in step 906.

Step 913: corresponding to the LIPA bearer, the base station GW doesn't allocate uplink user plane. Instead, the base station GW may directly send the TEID and TNL address, received from the MME, to the target HeNB, by using the path Switch request acknowledgement information.

Step 914: after receiving the path Switch request acknowledgement information, the T-HeNB sends a release resources message to the S—HeNB.

Based on above second method, FIG. 10 provides a work flowchart of an embodiment of the invention, in which handover is supported by a UMTS system. As shown in FIG. 10, the process includes the follows.

Step 1001 is similar to step 701, which is not repeated here.

Step 1002: the target HNB sends a HNBAP TNL Update Request to the HNB GW, to update TNL information of RAB to be relocated.

Furthermore, the HNB GW sends a HNBAP TNL Update Response. In the step, the RAB to be relocated may be all the RABs, or non-LIPA bearers. When the RAB to be relocated is all the RABs, the message may include the local access information, to indicate which bearer is LIPA bearer.

The step is optional, which may be not included in the solution.

Step 1003: the target HNB sends an RNA directly transfer message to the source HNB. The RNA directly transfer message includes RNSAP enhanced relocation response.

The message may be used for informing the source HNB that, preparations for the relocation are successful.

Step 1004: the source HNB sends an RNA directly transfer message to the target HNB to accept the relocation preparations. The RNA directly transfer message includes RNSAP relocation acceptance and information auxiliary for the relocation process.

Step 1005: the source HNB reconfigures the UE to start the relocation process.

Step 1006: physical layer synchronization is achieved between the UE and the target HNB.

The UE sends an RB reconfiguration complete message to the target HNB, to complete the RRC reconfiguration process.

Step 1007: the target HNB sends a HNBAP UE relocation complete message to the HNB GW, to indicate the HNB GW UE has successfully completed the relocation.

Specific informing modes may be as follows. Introduce the local access information to the E-RAB information corresponding to the LIPA bearer, to indicate which bearer is LIPA bearer. The HNB GW may hand over a user plane of non-LIPA bearer to the target HNB. Corresponding to the LIPA bearer, the base station GW will not allocate downlink user plane. Instead, the base station GW may directly send the TEID and TNL address, allocated by the base station, to its uplink node SGSN.

Step 1008: corresponding to the LIPA bearer, the HNB GW sends a relocation complete message to the SGSN.

The message includes Iu signaling connection identifier, established RAB identifier list, established user plane information of RAB including LIPA bearer, such as TNL address and TEID. The message may also simultaneously include information about non-LIPA bearer.

Step 1009: the SGSN may learn whether the bearer in the relocation complete message is LIPA bearer, according to UE context information.

Regarding the LIPA bearer, the SGSN will not allocate downlink user plane. Instead, the SGSN may directly send the TEID and TNL address allocated by the base station, received from base station GW, to its uplink node L-GW, by using the user plane update request message. The L-GW hands over transmission tunnel of downlink user plane, that is, hand over the downlink user plane from a tunnel allocated by the source base station to a downlink tunnel, allocated by the target base station.

Step 1010: the L-GW sends a user plane update response message to the SGSN.

Regarding the LIPA bearer, the SGSN will not allocate uplink user plane. Instead, the SGSN may directly send the TEID and TNL address, received from the L-GW, to the HNB GW, by using the relocation complete message.

Step 1011: the SGSN sends a relocation complete response message to the HNB GW.

The message includes information about RAB successfully established and RAB to be released. Regarding the RAB successfully established, directly send the TEID and TNL address received from the L-GW, to the HNB GW, by using the relocation complete message.

Step 1012: the HNB GW sends a HNBAP UE de-registration message to the source HNB, to indicate successful RNSAP relocation.

Step 1013: the source HNB sends an RNA disconnect message to the target HNB. The message includes RNSAP enhanced relocate signaling transfer, which is used for transmitting L3 information received by the source HNB during relocation process. The source base station releases resource of the UE.

When the source base station connects to the target base station via the HNB GW with Iurh connection, the RNA message may be routed via the HNB GW.

Such optimized relocation process is used in interior of the same HNB GW, and moving among HNBs within the same CSG. When supporting the LIPA bearer, the relocation process of non-LIPA bearer may be executed without SGSN. The L-GW may be informed about relocation of LIPA bearer via the SGSN.

FIG. 11 is a work flowchart illustrating a third method for supporting handover, in accordance with an embodiment of the invention. As shown in FIG. 11, the process includes the follows.

Step 1101: CN informs a base station GW, which bearer in the bearers to be established is LIPA bearer.

Furthermore, in the step, the CN may also inform the target base station GW uplink TEID and TNL address about the LIPA bearer. Specific informing modes may be as follows. Introduce local access information to the E-RAB information corresponding to the LIPA bearer. When such instruction is existed, it means that the corresponding bearer is LIPA bearer. An uplink GTP tunnel endpoint corresponding to the bearer is an IP address of L-GW and TEID allocated by the L-GW. When such instruction is not existed, it means that the bearer is a non-LIPA bearer. It may also directly introduce TEID of new information element L-GW and IP address of the L-GW, or GRE key and IP address of the L-GW, to the E-RAB information corresponding to the LIPA bearer, to indicate the LIPA bearer. It may also directly introduce the TEID of new information element L-GW or GRE key to the E-RAB information corresponding to the LIPA bearer, to indicate the LIPA bearer. When above E-RAB information includes the TEID of new L-GW or GRE key, TNL address in corresponding uplink GTP tunnel endpoint is the IP address of the L-GW. Other informing modes may be feasible, which will not affect main contents of the invention.

Step 1102: regarding the LIPA bearer, the base station GW will not allocate uplink user plane resources. Instead, the base station GW may directly send the TEID and TNL address received from the CN to the target base station.

Step 1103: the target base station GW informs the target base station, which bearer in the bears to be established in LIPA bearer.

Specific informing modes are same as step 1101, which is not repeated here.

Step 1104: regarding the LIPA bearer, the target base station sends a message to a corresponding L-GW, to request the L-GW to update downlink user plane transmission.

The message includes TEID and TNL address allocated by the target base station. Thus, the L-GW may be enabled to hand over the downlink user plane to a tunnel allocated by the target base station.

Thus, the whole work process about the third method for supporting handover, provided by an embodiment of the invention, is completed. In the embodiment, the CN informs the target base station GW LIPA bears in the bearers to be handed over. Subsequently, the target base station GW may inform the target base station. Regarding the LIPA bearer, the target base station sends a message to a corresponding L-GW, to request the L-GW to update downlink user plane transmission resources. Therefore, by adopting the method provided by the embodiment of the invention, a correct user plane transmission may be established for the UE, and successful handover may be guaranteed.

Based on the third method, work process about an embodiment of the invention is shown in FIG. 12, in which handover is supported by an LTE system. Detailed descriptions about the embodiment are provided in the following. In the embodiment, detailed descriptions about some steps having no relevance with the invention have been omitted.

Step 1201: a source base station decides to hand over.

Step 1202: the source base station sends a handover request to the source MME. The handover request includes information about the target base station, such as target base station ID, target TAI, which may also include information, such as target CSG and handover type.

Step 1203: the source MME sends a forward handover request message to the target MME. The forward handover request message includes information, such as target base station information, obtained from the handover request. The message may also include information about which bearer is LIPA bearer.

Step 1204: the target MME sends a handover request message to the target base station GW, to inform the target base station GW which bearer in the bearers to be handed over is LIPA bearer.

Specific informing methods are same as step 1101, which is not repeated here.

The target base station GW will not allocate uplink user plane resources for the LIPA bearer. Instead, the target base station GW may directly send the TEID and TNL address received from the MME to the target base station. When there is no HeNB GW deployed, the MME directly sends the handover request message to the target base station.

Step 1205: the target base station GW sends a handover request message to the target base station, to inform the target base station which bearer in the bearer to be handed over is LIPA bearer.

Specific informing methods are same as step 1102, which is not repeated here.

Step 1206: the target base station sends a Handover Request Acknowledgement to the target base station GW.

The message may only include RAB information about non-LIPA bearer, or the RAB information about all the bearers. When there is no HeNB GW deployed, the target base station directly sends a handover request message to the MME.

Step 1207, based on the local access information, the target base station sends a user plane update instruction to a corresponding L-GW, so as to update the downlink user plane of the LIPA bearer.

The message includes a downlink user plane allocated by the target base station for the LIPA bearer, e.g., the TEID and transmission layer address. One HeNB may connect to multiple L-GWs. In this case, the T-HeNB may find corresponding L-GW, according to the TNL address in uplink GTP tunnel endpoint of the LIPA bearer in step 1205.

Step 1208, the L-GW updates the downlink user plane information, hands over the downlink user plane to a tunnel allocated by the target base station.

Furthermore, the L-GW sends a User Plane Update Acknowledgement to the target base station. The message includes bearers updated successfully and bearers updated un-successfully. The message may also include uplink TEID and TNL address allocated by the L-GW. The MME may inform the target base station the TEID and TNL address allocated by the uplink L-GW. Alternatively, the target base station may also directly obtain them from the L-GW in the step.

Step 1209: the MME sends a modify bearer request message to the S-GW/PDN GW (PGW).

The message includes the downlink user plane information about all the bearers to be handed over for the UE, or only includes the downlink user plane information about non-LIPA bearer. The downlink user plane information may include IP address and TEID of the base station.

Step 1210: after modifying the UE bearer, the S-GW/PGW sends a modify bearer response message to the MME.

In the method provided by the embodiment of the invention, when the UE under handover only possesses LIPA bearer without non-LIPA bearer, steps 1209 and 1210 may be or may be not executed. When the UE under handover simultaneously hands over the LIPA bearer and non-LIPA bearer, steps 1209 and 12010 should be executed.

Based on the third method, work process about an embodiment of the invention, in which handover is supported by UMTS system, is shown in FIG. 13. Detailed descriptions about the embodiment are provided in the following.

Step 1301: a source base station decides to relocate.

Step 1302: the source base station sends a relocation requirements message to source HNB GW via Radio Access Network Application Part (RANAP) User Adaptation (RUA).

Step 1303: the source HNB GW sends a relocation requirements message to the SGSN.

Step 1304: the SGSN sends a relocation request message to the target HNB GW, to inform the target HNB GW which bearer in bearers to be handed over is LIPA bearer.

Specific informing modes may be as follows. Introduce the local access information to the E-RAB information corresponding to the LIPA bearer. The specific informing methods may be same as step 1101, which is not repeated here.

In the step, the target base station GW will not allocate uplink user plane resources for the LIPA bearer. Instead, the target base station GW may directly send the TEID and TNL address received from the SGSN to the target base station. The target HNB GW sends a relocation request message to the target HNB via the RUA. The message includes the local access information, to indicate which bearer is LIPA bearer.

Step 1305 is same as step 703. Detailed technical descriptions are omitted here.

Step 1306: the target HNB sends a Relocate Request Acknowledgement to the target HNB GW via the RUA. The target HNB GW sends a Relocate Request Acknowledgement to the SGSN.

The Relocate Request Acknowledgement may only include information about non-LIPA bearer, or simultaneously include information about the LIPA bearer.

Step 1307: the SGSN sends a relocate command message to the source HNB GW.

Step 1308: the source HNB GW sends a relocate command message to the source HNB via the RUA.

Step 1308: the source HNB forwards data to the target HNB.

Step 1309: the source HNB sends a relocation acceptance to the target HNB.

Step 1311: the source HNB sends RAN mobile information to the UE.

Step 1312: the UE sends an RAN mobile information acknowledgement message to the target HNB.

Step 1313 is similar to steps 709 and 710, which are not repeated here.

Step 1314: the target HNB sends a relocation complete message to the target HNB GW via the RUA. The target HNB GW sends a relocation complete message to the SGSN.

Step 1315: the SGSN sends an update PDP context request message to the GGSN.

The message may only include PDP context about non-LIPA bearer, or include PDP context about all the bearers.

Step 1316: the GGSN sends an update PDP context response message to the SGSN.

Step 1316: the SGSN sends an Iu release command message to the source HNB GW. The source HNB GW sends an Iu release command message to the source HNB with RUA.

Step 1317: the source HNB sends an Iu release command message to the source HNB GW with RUA. The HNB GW sends an Iu release command message to the SGSN.

Step 1318: when RA of the UE changes, execute routing area update process.

FIG. 14 is a work flowchart illustrating a fourth method for supporting handover, in accordance with an embodiment of the invention. As shown in FIG. 14, the process includes the follows.

Step 1401 is similar to step 1101, which is not repeated here.

Step 1402 is similar to step 1102, which is not repeated here.

Thus, the whole work process about the fourth handover method, in accordance with an embodiment of the invention, is completed. In the embodiment, the CN informs the target base station GW LIPA bearers in the bearers to be handed over, uplink TEID and TNL address of the LIPA bearer. Corresponding to the LIPA bearer, the target base station GW sends the TEID and TNL address received from the CN to the target base station.

Based on the fourth method, the work process about an embodiment of the invention, in which handover is supported by an LTE system, is shown in FIG. 15. Descriptions about the embodiment are provided in the following.

Steps 1501 to steps 1504 are similar to steps 1201 to 1204, which are not repeated here.

Step 1505: an MME sends a handover request message to target base station GW, to inform the target base station GW which bearer in the bearers to be handed over is LIPA bearer.

Specific informing modes may be as follows. Introduce the local access information to the E-RAB information corresponding to the LIPA bearer, to indicate which bearer is LIPA bearer. Regarding the LIPA bearer, the target base station GW will not allocate downlink user plane transmission resources. The target base station GW sends the TEID and TNL address received from the CN to the target base station.

In the step, furthermore, the target base station GW may send a handover request message to the target base station, to inform the target base station which bearer in the bearers to be handed over is LIPA bearer.

In the solution provided by the embodiment, the handover request message sent by the target base station GW to the target base station may not include the local access information.

Step 1506: the target base station sends a Handover Request Acknowledgement to the target base station GW. The message carries information about all the bearers, including LIPA bearers and non-LIPA bearers.

Based on the local access information stored, the target HeNB GW will not allocate downlink user plane transmission resources for the LIPA bearer. Instead, the target HeNB GW directly sends the TEID and TNL address of the downlink user plane received from the target HeNB to the MME, by using the Handover Request Acknowledgement.

Step 1507: the MME sends a Modify Bearer Request to the S-GW.

The message includes the downlink user plane information about all the bearers to be handed over for the UE. The downlink user plane information includes IP address and TEID of the base station. The message includes the local access information, to indicate which bearer is LIPA bearer. Regarding the LIPA bearer, the S-GW will not allocate uplink and downlink user plane resources.

Step 1508: regarding the LIPA bearer, the S-GW sends a modify bearer request message to the L-GW, so as to send the downlink user plane information received from the MME, such as the TEID and TNL address, to the L-GW.

Regarding the non-LIPA bearer, the S-GW needs to send a modify bearer request message to the P-GW. Detailed technical descriptions are omitted here.

Step 1509: after modifying the UE bearer, the L-GW sends a modify bearer response message to the S-GW.

Step 1510: the S-GW sends a modify bearer response message to the MME.

Regarding the LIPA bearer, the message may include the uplink TEID and TNL address allocated by the L-GW.

Based on the fourth method, work process about an embodiment of the invention, in which handover is supported by an UMTS system, is shown in FIG. 16. Descriptions about the embodiment are provided in the following.

Steps 1601 to 1604 are similar to steps 1301 to 1304, which are not repeated here.

Step 1605: the target HNB sends a Relocate Request Acknowledgement to the target HNB GW with the RUA.

The message may include or not include the local access information. When the message includes the local access information, the local access information may be carried in the RUA or the RANAP.

Step 1606: the target HNB GW will not allocate downlink user plane resources for the LIPA bearer, according to the local access information stored or received from the target HNB. Instead, the target HNB GW will send a Relocate Request Acknowledgement to the SGSN.

The Relocate Request Acknowledgement includes the downlink user plane information about the LIPA bearer. For example, the TEID and TNL address are received from the target HNB.

Steps 1607 to 1613 are similar to steps 1307 to 1314, which are not repeated here.

Step 1614: regarding the LIPA bearer, the SGSN will not allocate uplink and downlink user plane resources. Instead, the SGSN may send an update PDP context request to the L-GW, directly send the TEID and TNL address allocated by the base station to the L-GW by using the update PDP context request.

Steps 1615 to 1617 are similar to steps 1316 to 1318, which are not repeated here.

Regarding a non-LIPA bearer, the SGSN needs to send a modify bearer request to the GGSN. Detailed technical descriptions are omitted here.

Step 1614: after modifying the UE bearer, the L-GW sends a modify bearer response to the SGSN.

FIG. 17 illustrates an embodiment of the invention, in which handover is supported. The embodiment is about a handover process based on the third architecture (illustrated in FIG. 2c). As shown in FIG. 17, the process includes the follows.

Steps 1701 to 1703 are similar to steps 601 to 603, which are not repeated here.

Steps 1704 to 1705 are similar to steps 605 to 606, which are not repeated here.

Step 1706: the T-HeNB sends a path switch request to the L-GW, to inform the L-GW which bearer in the bearers to be handed over is LIPA bearer.

One HeNB may connect to multiple L-GWs. In this case, the T-HeNB may find a corresponding L-GW, according to the TNL address in the uplink GTP tunnel endpoint of the LIPA bearer in step 1702.

The message includes the local access information, which is used for informing the L-GW which bearer is LIPA bearer. After receiving the path switch request, the L-GW may hand over transmission tunnel of the downlink user plane. That is, hand over the downlink user plane from a tunnel allocated by the source base station to a downlink tunnel allocated by the target base station. Regarding the non-LIPA bearer, the L-GW will not allocate uplink and downlink user plane. In the uplink, the L-GW directly sends the TEID and TNL address, obtained from the base station GW, to the target base station in step 1713. In the downlink, the L-GW directly sends the TEID and TNL address, received from the target base station, to the base station GW.

The L-GW sends a path switch request to the HeNB GW. The path switch request includes the local access information, which is used for informing the HeNB GW which bearer is LIPA bearer. Regarding the LIPA bearer, the base station GW will not allocate downlink user plane. Instead, the base station GW may directly send the TEID and TNL address allocated by the base station to its uplink node MME. Alternatively, the message sent by the T-HeNB to the HeNB GW may not include the local access information. Actions of the HeNB GW are same as that in the prior art. That is, it may allocate or not allocate the uplink and downlink use plane resources.

Step 1707: the HeNB GW sends a path switch request to the MME, to inform the MME which bearer in the bearers to be handed over is LIPA bearer.

Regarding the LIPA bearer, information about the E-RAB to be handed over in the downlink included in the message may include, the TEID allocated by the T-HeNB and corresponding TNL address. The path switch request sent by the HeNB GW to the MME may include or not include the local access information, which is not necessary, because the MME has already learned which bearer is LIPA bearer.

Steps 1708 to 1709 are similar to steps 908 to 909, which are not repeated here.

Step 1710: regarding the LIPA bearer, the S-GW may allocate TEID and TNL address for a downlink user, so as to facilitate the L-GW to send a downlink paging to the S-GW.

As another method of the present invention, the S-GW may not allocate downlink user plane. Instead, the S-GW directly enables the Modify Bearer Request to carry the TEID and TNL address allocated by the base station, and sends the Modify Bearer Request to its uplink node L-GW. The L-GW may hand over a transmission tunnel of user plane in step 1706 or in the step. That is, the L-GW may hand over the downlink user plane from a tunnel allocated by the source base station to a downlink tunnel allocated by the target base station. The L-GW sends a Modify Bearer Response to the S-GW.

Step 1711: the S-GW sends a modify bearer response to the MME.

Regarding the LIPA bearer, the S-GW may allocate or not allocate uplink user plane.

The S-GW may directly enable the modify bearer response to carry the TEID and TNL address allocated by the L-GW, and send the modify bearer response to the MME.

Step 1712: the MME sends a Path Switch Request Acknowledgement to the HeNB GW, to inform the HeNB GW which bearer in the bearers to be handed over is LIPA bearer.

Specific informing modes may be as follows. Introduce the local access information to the E-RAB information corresponding to the LIPA bearer, to indicate which bearer is LIPA bearer. Alternatively, the E-RAB information corresponding to the LIPA bearer may not include the local access information. The HeNB GW may learn which bearer is LIPA bearer, according to information stored after receiving information in step 1706.

Regarding the LIPA bearer, the base station GW may allocate uplink TEID and TNL address. Alternatively, the base station GW may not allocate uplink user plane. Instead, the base station GW may directly enable the Path Switch Request Acknowledgement to carry the TEID and TNL address received from the MME, and send the Path Switch Request Acknowledgement to the L-GW.

The HeNB GW sends a Path Switch Request Acknowledgement to the L-GW. The message includes the local access information, to indicate which bearer is LIPA bearer. Alternatively, the message may not include the local access information. The L-GW may learn which bearer is LIPA bearer, according to information stored after receiving information in step 1706.

Regarding the non-LIPA bearer, the L-GW will not allocate uplin user plane. Instead, the L-GW may directly send the TEID and TNL address received from the base station GW to the target base station in step 1713.

Step 1713: the L-GW sends a Path Switch Request Acknowledgement to the T-HeNB.

Step 1714: after receiving the Path Switch Request Acknowledgement, the T-HeNB sends a Release Resource to the S—HeNB.

FIG. 18 illustrates an embodiment of the invention, in which handover is supported.

The embodiment is also about a handover process based on the third architecture (illustrated in FIG. 2c). As shown in FIG. 18, the process includes the follows.

Steps 1801 to 1805 are similar to steps 1701 to 1705, which are not repeated here.

Step 1806: regarding the LIPA bearer, the T-HeNB sends a Path Switch Request to the L-GW, to inform the L-GW which bearer in the bearers to be handed over is LIPA bearer.

One HeNB may connect to multiple L-GWs. In this case, the T-HeNB may find a corresponding L-GW, according to the TNL address in the uplink GTP tunnel endpoint of the LIPA bearer in step 1802. The L-GW may store downlink TEID and TNL address. After receiving the Path Switch Request, the L-GW may hand over a transmission tunnel of the downlink user plane, that is, hand over the downlink user plane from a tunnel allocated by the source base station to a downlink tunnel allocated by the target base station.

Step 1807: the L-GW sends a Path Switch Request to the HeNB GW. The HeNB GW sends a Path Switch Request to the MME.

Generally, after receiving the Path Switch Request, when all the E-RAB information stored in the UE context doesn't exist in the Path Switch Request, the MME learns that the E-RAB not included has been released by the eNB. Corresponding to the method provided by the embodiment of the invention, when finding there is only LIPA bearer or non-LIPA bearer in the above message, the MME regards that a Path Switch Request including non-LIPA bearer and LIPA bearer will be received subsequently. When there is only LIPA bearer in the received message, the MME regards that a Path Switch Request including non-LIPA bearer will be received subsequently. And the MME regards that the LIPA bearers not included in the message is released by the eNB. When there is only non-LIPA bearer in the received message, the MME regards that a Path Switch Request including the LIPA bearer will be received subsequently. And the MME regards that the non-LIPA bearer not included in the message is released by eNB.

Steps 1808 to steps 1810 are similar to steps 1708, 1710 and 1711, which are not repeated here.

Step 1811: the MME sends a Path Switch Request Acknowledge to the HeNB GW, to inform the HeNB GW which bearer in the bearers to be handed over is LIPA bearer.

Specific informing modes may be as follows. Introduce the local access information to the E-RAB information corresponding to the LIPA bearer, to indicate which bearer is LIPA bearer. Corresponding to the LIPA bearer, the base station GW may allocate uplink TEID and TNL address. Alternatively, the base station GW may not allocate the uplink user plane. Instead, the base station GW may enable the Path Switch Request Acknowledge to carry the TEID and TNL address, and directly send the Path Switch Request Acknowledge to the L-GW.

The HeNB GW sends a Path Switch Request Acknowledge to the L-GW. The Path Switch Request Acknowledge includes the local access information, to indicate which bearer is LIPA bearer.

Step 1812: the L-GW sends a Path Switch Request Acknowledge to the T-HeNB.

Step 1813: regarding a non-LIPA bearer, the T-HeNB may send a Path Switch Request to the HeNB GW.

Block 1814: the HeNB GW sends a Path Switch Request to the MME.

Step 1815: the MME sends a Modify Bearer Request to the S-GW. The S-GW sends a Modify Bearer Request to the PDN GW.

Step 1816: after modifying the UE bearer, the PDN GW sends a Modify Bearer Response to the S-GW. The S-GW sends a Modify Bearer Response to the MME.

Step 1817: the MME sends a Path Switch Request Acknowledge to the HeNB GW. The HeNB GW sends a Path Switch Request Acknowledge to the T-HeNb.

Step 1819: after receiving the Path Switch Request Acknowledge, the T-HeNB sends a Release Resource to the S—HeNB.

Thus, the whole work process about the method for supporting handover, provided by the embodiment of the invention, is completed.

A apparatus for the whole work process about the method for supporting handover may comprising receiver, transmitter and controller for the performing the method for supporting handover.

In the foregoing, detailed descriptions about objectives, technical solutions and advantages of the invention are further provided, accompanying with preferred embodiments. It should be understood that, the foregoing is only preferred embodiments of the invention, which is not used for limiting the invention. Any modifications, equivalent substitutions and improvements made within the spirit and principle of the invention, should be covered by the protection scope of the invention.

The invention claimed is:

1. A method for supporting a handover in a wireless communication system supporting a local internet protocol access (LIPA), the method comprising:
receiving, from a source base station by a target base station, information indicating a LIPA bearer among bearers for the handover;
transmitting, to a local gateway (L-GW) by the target base station, a request message for requesting the L-GW to perform a handover of a downlink user plane from a first transmission tunnel to a second transmission tunnel that are associated with the LIPA bearer, wherein the first transmission tunnel is allocated by the source base station and the second transmission tunnel is allocated by the target base station; and receiving, from the L-GW by the target base station, a response message for representing whether or not the bearers for the handover are modified successfully, wherein the information indicating the LIPA bearer includes an uplink tunnel endpoint identifier (TEID) of the L-GW and an internet protocol (IP) address of the L-GW, and wherein the request message includes a TEID of the downlink user plane and a transport network layer (TNL) address allocated by the target base station in the LIPA bearer.

2. The method of claim 1, wherein the information indicating a LIPA bearer includes information associated with a radio access bearer (RAB) corresponding to the LIPA bearer.

3. A base station for supporting a handover in a wireless communication system supporting a local internet protocol access (LIPA), the base station comprising:
 a receiver configured to receive, from a source base station, information indicating a LIPA bearer among bearers for the handover; and
 a controller configured to:
  transmit, to a local gateway (L-GW), a request message for requesting the L-GW to perform a handover of a downlink user plane from a first transmission tunnel to a second transmission tunnel, wherein the first transmission tunnel is allocated by the source base station and the second transmission tunnel is allocated by a target base station; and
  receive, from the L-GW, a response message for representing whether or not the bearers for the handover are modified successfully,
 wherein the information indicating the LIPA bearer includes an uplink tunnel endpoint identifier (TEID) of the L-GW and an internet protocol (IP) address of the L-GW, and
 wherein the request message includes a TEID of the downlink user plane and a transport network layer (TNL) address allocated by the target base station in the LIPA bearer.

4. The base station of claim 3, wherein the information indicating a LIPA bearer includes information associated with a radio access bearer (RAB) corresponding to the LIPA bearer.

5. A method for supporting a handover in a wireless communication system supporting a local internet protocol access (LIPA), the method comprising:
 receiving, from a target base station by a local gateway (L-GW), a request message for requesting a handover of a downlink user plane from a first transmission tunnel to a second transmission tunnel that are associated with an LIPA bearer, the request message including information indicating the LIPA bearer among bearers for the handover, wherein the first transmission tunnel is allocated by a source base station and the second transmission tunnel is allocated by the target base station;
 transmitting, to the target base station by the L-GW, a response message for representing whether or not the bearers for the handover are modified successfully, wherein the information indicating the LIPA bearer includes an uplink tunnel endpoint identifier (TEID) of the L-GW and an internet protocol (IP) address of the L-GW, and wherein the request message includes a TEID of the downlink user plane and a transport network layer (TNL) address allocated by the target base station in the LIPA bearer; and
 performing the handover of the downlink user plane from the first transmission tunnel to the second transmission tunnel.

6. A local gateway (L-GW) for supporting a handover in a wireless communication system supporting a local internet protocol access (LIPA), the local gateway comprising:
 a communication interface configured to communicate with another network entity; and
 a controller configured to:
  receive, from a target base station, a request message for requesting a handover of a downlink user plane from a first transmission tunnel to a second transmission tunnel that are associated with an LIPA bearer, the request message including information indicating the LIPA bearer among bearers for the handover, the first transmission tunnel is allocated by a source base station and the second transmission tunnel is allocated by the target base station;
  transmit to the target base station, a response message for representing whether or not the bearers for the handover are modified successfully, wherein the information indicating the LIPA bearer includes an uplink tunnel endpoint identifier (TEID) of the L-GW and an internet protocol (IP) address of the L-GW, and wherein the request message includes a TEID of the downlink user plane and a transport network layer (TNL) address allocated by the target base station in the LIPA bearer; and
  perform the handover of the downlink user plane from the first transmission tunnel to the second transmission tunnel.

7. A method for supporting a handover in a wireless communication system supporting a local internet protocol access (LIPA), the method comprising:
 receiving, from a mobile management entity (MME) by a target base station, information indicating a LIPA bearer among bearers for the handover;
 transmitting, to a local gateway (L-GW) by the target base station, a request message for requesting the L-GW to perform a handover of a downlink user plane from a first transmission tunnel to a second transmission tunnel that are associated with the LIPA bearer, wherein the first transmission tunnel is allocated by a source base station and the second transmission tunnel is allocated by the target base station; and
 receiving, from the L-GW by the target base station, a response message for representing whether or not the bearers for the handover are modified successfully, wherein the information indicating the LIPA bearer includes an uplink tunnel endpoint identifier (TEID) of the L-GW and an internet protocol (IP) address of the L-GW, and wherein the request message includes a TEID of the downlink user plane and a transport network layer (TNL) address allocated by the target base station in the LIPA bearer.

8. A base station for supporting a handover in a wireless communication system supporting a local internet protocol access (LIPA), the base station comprising:
 a receiver configured to receive, from a mobile management entity (MME), information indicating a LIPA bearer among bearers for the handover; and
 a controller configured to:
  transmit, to a local gateway (L-GW), a request message for requesting the L-GW to perform a handover of a downlink user plane from a first transmission tunnel to a second transmission tunnel that are associated with the LIPA bearer from a source base station to a target base station, the first transmission tunnel is allocated by the source base station and the second transmission tunnel is allocated by the target base station; and receive, from the L-GW, a response message for representing whether or not the bearers for the handover are modified successfully, wherein the information indicating the LIPA bearer includes an uplink tunnel endpoint identifier (TEID) of the L-GW and an internet protocol (IP) address of the L-GW, and wherein the request message includes a TEID of the downlink user plane and a transport network layer (TNL) address allocated by the target base station in the LIPA bearer.

* * * * *